US012688821B2

(12) United States Patent
Kim et al.

(10) Patent No.: US 12,688,821 B2
(45) Date of Patent: Jul. 21, 2026

(54) DISPLAY DEVICE INCLUDING LIGHT SENSING PIXEL

(71) Applicant: Samsung Display Co., LTD., Yongin-si (KR)

(72) Inventors: Chul Kim, Yongin-si (KR); Jongyeop An, Yongin-si (KR); Dongwook Yang, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/981,251

(22) Filed: Dec. 13, 2024

(65) Prior Publication Data

US 2025/0316214 A1 Oct. 9, 2025

(30) Foreign Application Priority Data

Apr. 5, 2024 (KR) ........................ 10-2024-0046992

(51) Int. Cl.

*G09G 3/32* (2016.01)
*G09G 3/3266* (2016.01)
*G09G 3/3275* (2016.01)

(52) U.S. Cl.

CPC ............. *G09G 3/32* (2013.01); *G09G 3/3266* (2013.01); *G09G 3/3275* (2013.01); *G09G 2300/0842* (2013.01); *G09G 2310/0267* (2013.01); *G09G 2310/0275* (2013.01); *G09G 2310/061* (2013.01); *G09G 2310/08* (2013.01); *G09G 2360/142* (2013.01)

(58) Field of Classification Search

CPC ... G09G 2300/0842; G09G 2310/0267; G09G 2310/0275; G09G 2310/061; G09G 2310/08; G09G 2360/142; G09G 3/32; G09G 3/3266; G09G 3/3275

See application file for complete search history.

(56) References Cited

U.S. PATENT DOCUMENTS

| | | | | |
|---|---|---|---|---|
| 10,398,324 | B2 | 9/2019 | Mukkamala et al. | |
| 11,158,258 | B2 | 10/2021 | Cha et al. | |
| 2021/0158751 | A1* | 5/2021 | Cha | G09G 3/3233 |
| 2022/0198174 | A1* | 6/2022 | Lee | G06V 40/1318 |

(Continued)

FOREIGN PATENT DOCUMENTS

| | | | |
|---|---|---|---|
| KR | 10-2020-0007312 | A | 1/2020 |
| KR | 10-2022-0052048 | A | 4/2022 |

(Continued)

*Primary Examiner* — Nitin Patel
*Assistant Examiner* — Amen W Bogale
(74) *Attorney, Agent, or Firm* — Womble Bond Dickinson (US) LLP

(57) ABSTRACT

A display device includes a display panel including a light-emitting pixel including a light-emitting element, and a light-sensing pixel including an organic photodiode, and configured to reset the organic photodiode to a reset voltage in response to a global reset signal, a data driver configured to provide a data signal to the light-emitting pixel, a scan driver configured to provide a scan signal to the light-emitting pixel and to the light-sensing pixel, and a readout circuit connected to the light-sensing pixel through a readout line, and configured to change at least one of the global reset signal or the reset voltage between a first sensing mode and a second sensing mode.

19 Claims, 21 Drawing Sheets

(56) References Cited

U.S. PATENT DOCUMENTS

| | | | | |
|---|---|---|---|---|
| 2022/0208088 | A1* | 6/2022 | Kim | H10K 50/813 |
| 2023/0049300 | A1* | 2/2023 | Katsuta | G09G 3/3266 |
| 2024/0296785 | A1 | 9/2024 | Kim et al. | |

FOREIGN PATENT DOCUMENTS

| | | | |
|---|---|---|---|
| KR | 10-2023-0065238 | A | 5/2023 |
| KR | 10-2023-0074365 | A | 5/2023 |

* cited by examiner

FIG. 8

| MODE | VRST |
|---|---|
| NM | -6.5V |
| FSM | -8.4V |
| PSM | -4.7V |

FIG. 10

| MODE | GR | |
| --- | --- | --- |
| | VGH | VGL |
| NM | 7V | -8V |
| FSM | 7V | -9V |
| PSM | 7V | -8V |

DISPLAY DEVICE INCLUDING LIGHT SENSING PIXEL

CROSS-REFERENCE TO RELATED APPLICATION

The present application claims priority to, and the benefit of, Korean Patent Application No. 10-2024-0046992, filed on Apr. 5, 2024, in the Korean Intellectual Property Office, the entire disclosure of which is incorporated by reference herein.

BACKGROUND

1. Field

Embodiments of the present disclosure relate to a display device including a light-sensing pixel having an organic photodiode.

2. Description of the Related Art

Electronic devices (e.g., a smart phone, a smart watch, etc.) have been developed, which perform bio-sensing operations (e.g., a fingerprint-sensing operation, a photoplethysmography (PPG)-sensing operation, etc.). These electronic devices may perform the bio-sensing operations using a sensor that is separate from a display device. In this case, the size of a display region of the display device may be reduced, and the size of a bezel may be increased.

Attempts have been made to solve this problem. For example, an in-cell light sensor technique has been used that employs an optical sensor or a light-sensing pixel within the display region of the display device.

SUMMARY

Some embodiments provide a display device capable of improving or optimizing a driving condition in each of a plurality of sensing modes.

According to embodiments, there is provided a display device including a display panel including a light-emitting pixel including a light-emitting element, and a light-sensing pixel including an organic photodiode, and configured to reset the organic photodiode to a reset voltage in response to a global reset signal, a data driver configured to provide a data signal to the light-emitting pixel, a scan driver configured to provide a scan signal to the light-emitting pixel and to the light-sensing pixel, and a readout circuit connected to the light-sensing pixel through a readout line, and configured to change at least one of the global reset signal or the reset voltage between a first sensing mode and a second sensing mode.

The first sensing mode may be a fingerprint-sensing mode in which a fingerprint of a user is configured to be sensed, wherein the second sensing mode is a photoplethysmography-sensing mode in which a volume of a blood vessel of a finger of the user is configured to be sensed.

In the fingerprint-sensing mode, the light-emitting pixel in a first sensing region may be configured to emit light, and the light-sensing pixel in the first sensing region may be configured to sense reflected light, wherein, in the photoplethysmography-sensing mode, the light-emitting pixel in an adjacent region adjacent to a second sensing region is configured to emit light, and the light-sensing pixel in the second sensing region is configured to sense reflected light.

The first sensing mode may be a fingerprint-sensing mode, and the second sensing mode may be a photoplethysmography-sensing mode, wherein the readout circuit is configured to change a voltage level of the reset voltage between the fingerprint-sensing mode and the photoplethysmography-sensing mode.

In a normal mode, the readout circuit may be configured to set the reset voltage to a first voltage level, wherein, in the fingerprint-sensing mode, the readout circuit is configured to set the reset voltage to a second voltage level that is different from the first voltage level, and wherein, in the photoplethysmography-sensing mode, the readout circuit is configured to set the reset voltage to a third voltage level that is different from the first and second voltage levels.

The second voltage level may be lower than the first voltage level, wherein the third voltage level is higher than the first voltage level.

The first sensing mode may be a fingerprint-sensing mode, and the second sensing mode may be a photoplethysmography-sensing mode, wherein the readout circuit is configured to change a voltage level of a low gate voltage of the global reset signal between the fingerprint-sensing mode and the photoplethysmography-sensing mode.

In a normal mode, the readout circuit may be configured to set the low gate voltage of the global reset signal to a first voltage level, wherein, in the fingerprint-sensing mode, the readout circuit is configured to set the low gate voltage of the global reset signal to a second voltage level that is different from the first voltage level, and wherein, in the photoplethysmography-sensing mode, the readout circuit is configured to set the low gate voltage of the global reset signal to the first voltage level.

The first sensing mode may be a fingerprint-sensing mode, and the second sensing mode may be a photoplethysmography-sensing mode, wherein the readout circuit is configured to change a timing of a low gate voltage of the global reset signal between the fingerprint-sensing mode and the photoplethysmography-sensing mode.

In the fingerprint-sensing mode, the readout circuit may be configured to provide the global reset signal having a high gate voltage to the light-sensing pixel during a first frame period, wherein, in the photoplethysmography-sensing mode, the readout circuit is configured to provide the global reset signal having the high gate voltage to the light-sensing pixel during a portion of a second frame period.

The first sensing mode may be a fingerprint-sensing mode, and the second sensing mode may be a photoplethysmography-sensing mode, wherein the readout circuit is configured to change at least one of a waveform or a slew rate of the global reset signal between the fingerprint-sensing mode and the photoplethysmography-sensing mode.

The light-emitting pixel may include a first transistor configured to generate a driving current, the light-emitting element configured to emit light based on the driving current, a second transistor configured to transfer the data signal in response to a write signal, a third transistor configured to diode-connect the first transistor in response to a compensation signal, a fourth transistor configured to transfer an initialization voltage to a gate of the first transistor in response to an initialization signal, a fifth transistor configured to connect a line that is configured to transfer a first power supply voltage and the first transistor in response to an emission signal, a sixth transistor configured to connect the first transistor and the light-emitting element in response to the emission signal, a seventh transistor configured to transfer an anode initialization voltage to the light-emitting element in response to a bypass signal, an eighth transistor configured to transfer a bias voltage to one terminal of the first transistor in response to the bypass signal, and a storage capacitor connected between the line that is configured to transfer the first power supply voltage and the gate of the first transistor.

The light-sensing pixel may include a ninth transistor configured to generate a sensing current based on a voltage of an anode of the organic photodiode, a tenth transistor configured to transfer the reset voltage to the anode of the organic photodiode in response to the global reset signal, an eleventh transistor configured to connect the ninth transistor and the readout line in response to the write signal, and the organic photodiode.

The ninth transistor may include a gate connected to the organic photodiode, a first terminal that is configured to receive a sensing reference voltage, and a second terminal, wherein the tenth transistor includes a gate that is configured to receive the global reset signal, a first terminal that is configured to receive the reset voltage, and a second terminal connected to the anode of the organic photodiode, wherein the eleventh transistor includes a gate that is configured to receive the write signal, a first terminal connected to the second terminal of the ninth transistor, and a second terminal connected to the readout line, and wherein the organic photodiode includes an anode connected to the gate of the ninth transistor, and a cathode connected to a line that is configured to transfer a second power supply voltage.

The readout circuit may include a global reset circuit configured to generate the global reset signal, a sensing circuit configured to receive a sensing current of the light-sensing pixel through the readout line, and to generate a digital sensing signal corresponding to the sensing current, and a register configured to store setting values for the global reset signal and the reset voltage in a normal mode, the first sensing mode, and the second sensing mode.

The sensing circuit may include an amplifier including an inverting input terminal connected to the readout line, a non-inverting input terminal that is configured to receive a reference voltage, and an output terminal, an integrating capacitor connected between the inverting input terminal and the output terminal of the amplifier, a reset switch configured to reset the integrating capacitor, a noise capacitor configured to store a noise voltage output from the amplifier, a noise switch configured to selectively connect the output terminal of the amplifier and the noise capacitor, a signal capacitor configured to store a signal voltage output from the amplifier, a signal switch configured to selectively connect the output terminal of the amplifier and the signal capacitor, and an analog-to-digital converter configured to generate the digital sensing signal based on a difference between the noise voltage and the signal voltage.

According to embodiments, there is provided a display device including a display panel including a light-emitting pixel including a light-emitting element, and a light-sensing pixel including an organic photodiode, and configured to reset the organic photodiode to a reset voltage in response to a global reset signal, a data driver configured to provide a data signal to the light-emitting pixel, a scan driver configured to provide a scan signal to the light-emitting pixel and to the light-sensing pixel, and a readout circuit connected to the light-sensing pixel through a readout line, and configured to change a voltage level of the reset voltage among a normal mode, a fingerprint-sensing mode, and a photoplethysmography-sensing mode.

In the normal mode, the readout circuit may be configured to set the reset voltage to a first voltage level, wherein, in the fingerprint-sensing mode, the readout circuit is configured to set the reset voltage to a second voltage level that is different from the first voltage level, and wherein, in the photoplethysmography-sensing mode, the readout circuit is configured to set the reset voltage to a third voltage level that is different from the first and second voltage levels.

According to embodiments, there is provided a display device including a display panel including a display panel including a light-emitting pixel including a light-emitting element, and a light-sensing pixel including an organic photodiode and configured to reset the organic photodiode to a reset voltage in response to a global reset signal, a data driver configured to provide a data signal to the light-emitting pixel, a scan driver configured to provide a scan signal to the light-emitting pixel and to the light-sensing pixel, and a readout circuit connected to the light-sensing pixel through a readout line, and configured to change at least one of a voltage level, a timing, a waveform, or a slew rate of the global reset signal among a normal mode, a fingerprint-sensing mode, and a photoplethysmography-sensing mode.

In the normal mode, the readout circuit may be configured to set a low gate voltage of the global reset signal to a first voltage level, wherein, in the fingerprint-sensing mode, the readout circuit is configured to set the low gate voltage of the global reset signal to a second voltage level that is different from the first voltage level, and wherein, in the photoplethysmography-sensing mode, the readout circuit is configured to set the low gate voltage of the global reset signal to the first voltage level.

In the fingerprint-sensing mode, the readout circuit may be configured to provide the global reset signal having a high gate voltage to the light-sensing pixel during a first frame period, wherein, in the photoplethysmography-sensing mode, the readout circuit is configured to provide the global reset signal having the high gate voltage to the light-sensing pixel during a portion of a second frame period.

As described above, in a display device according to embodiments, a readout circuit may change at least one of a global reset signal and a reset voltage provided to a light-sensing circuit between a first sensing mode (e.g., a fingerprint-sensing mode) and a second sensing mode (e.g., a photoplethysmography-sensing mode). Accordingly, driving conditions may be improved or optimized in respective sensing modes, and sensing operations may be more accurately performed in the respective sensing modes.

BRIEF DESCRIPTION OF THE DRAWINGS

Illustrative, non-limiting embodiments will be more clearly understood from the following detailed description in conjunction with the accompanying drawings.

FIG. 8 is a diagram illustrating an example of a voltage level of a reset voltage in a normal mode, a fingerprint-sensing mode, and a photoplethysmography-sensing mode.

FIG. 10 is a diagram illustrating an example of a voltage level of a global reset signal in a normal mode, a fingerprint-sensing mode, and a photoplethysmography-sensing mode.

DETAILED DESCRIPTION

Figure 1:
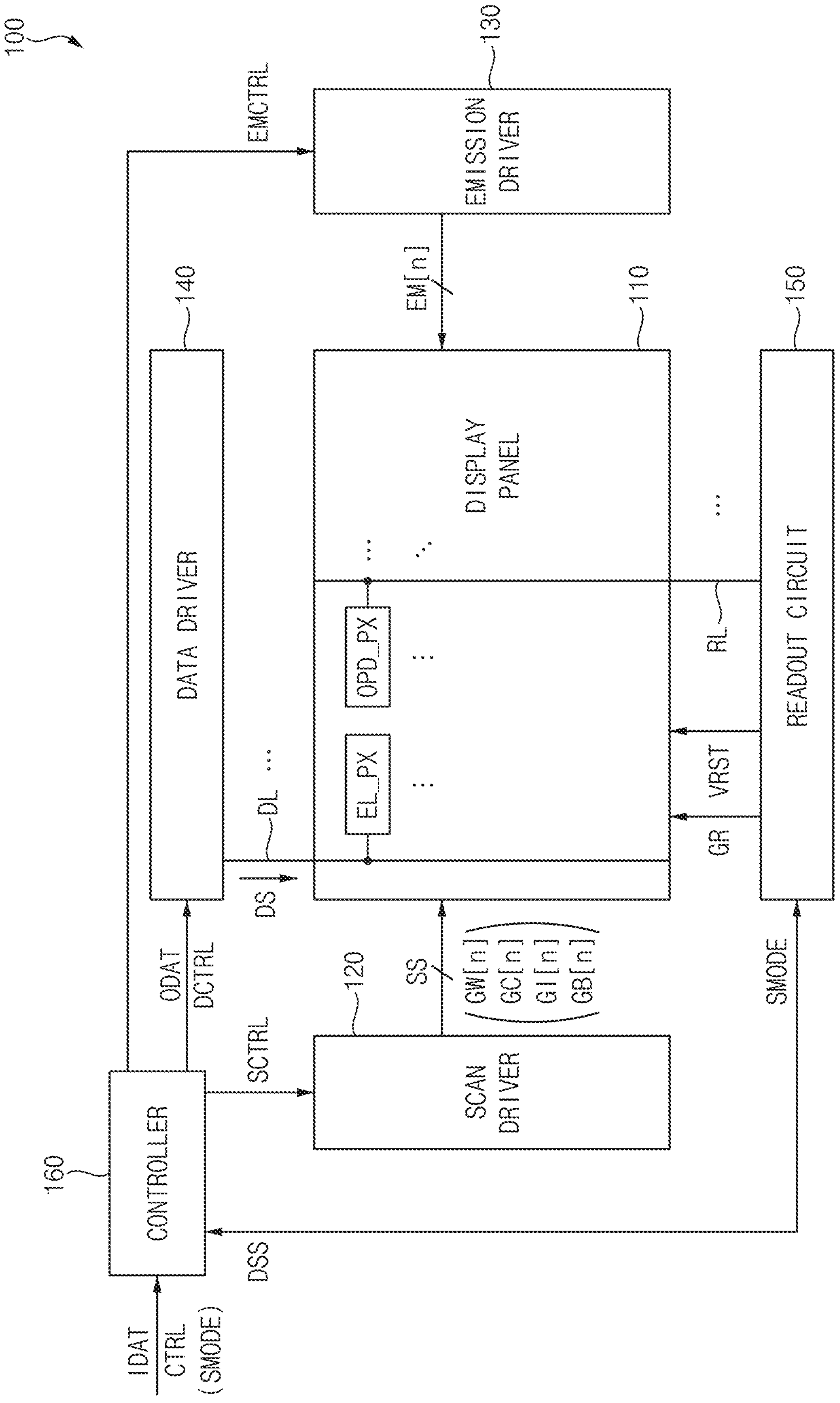
FIG. 1 is a block diagram illustrating a display device according to embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto.

It will be understood that when an element, layer, region, or component is referred to as being "on," "connected to," or "(operatively or communicatively) coupled to" another element, layer, region, or component, it can be directly on, connected to, or coupled to the other element, layer, region, or component, or indirectly on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device according to embodiments.

Referring to FIG. 1, a display device 100 according to embodiments may include a display panel 110 that includes a light-emitting pixel EL_PX and a light-sensing pixel OPD_PX, a scan driver 120 that provides a scan signal SS to the light-emitting pixel EL_PX and the light-sensing pixel OPD_PX, an emission driver 130 that provides an emission signal EM[n] to the light-emitting pixel EL_PX, a data driver 140 that provides a data signal DS to the light-emitting pixel EL_PX, a readout circuit 150 connected to the light-sensing pixel OPD_PX through a readout line RL, and a controller 160 that controls an operation of the display device 100.

The display panel 110 may include a plurality of light-emitting pixels EL_PX and a plurality of light-sensing pixels OPD_PX. In some embodiments, each light-emitting pixel EL_PX may include a light-emitting element, and may emit light by using the light-emitting element. Further, each light-sensing pixel OPD_PX may include an organic photodiode, and may sense light by using the organic photodiode.

Figure 2:
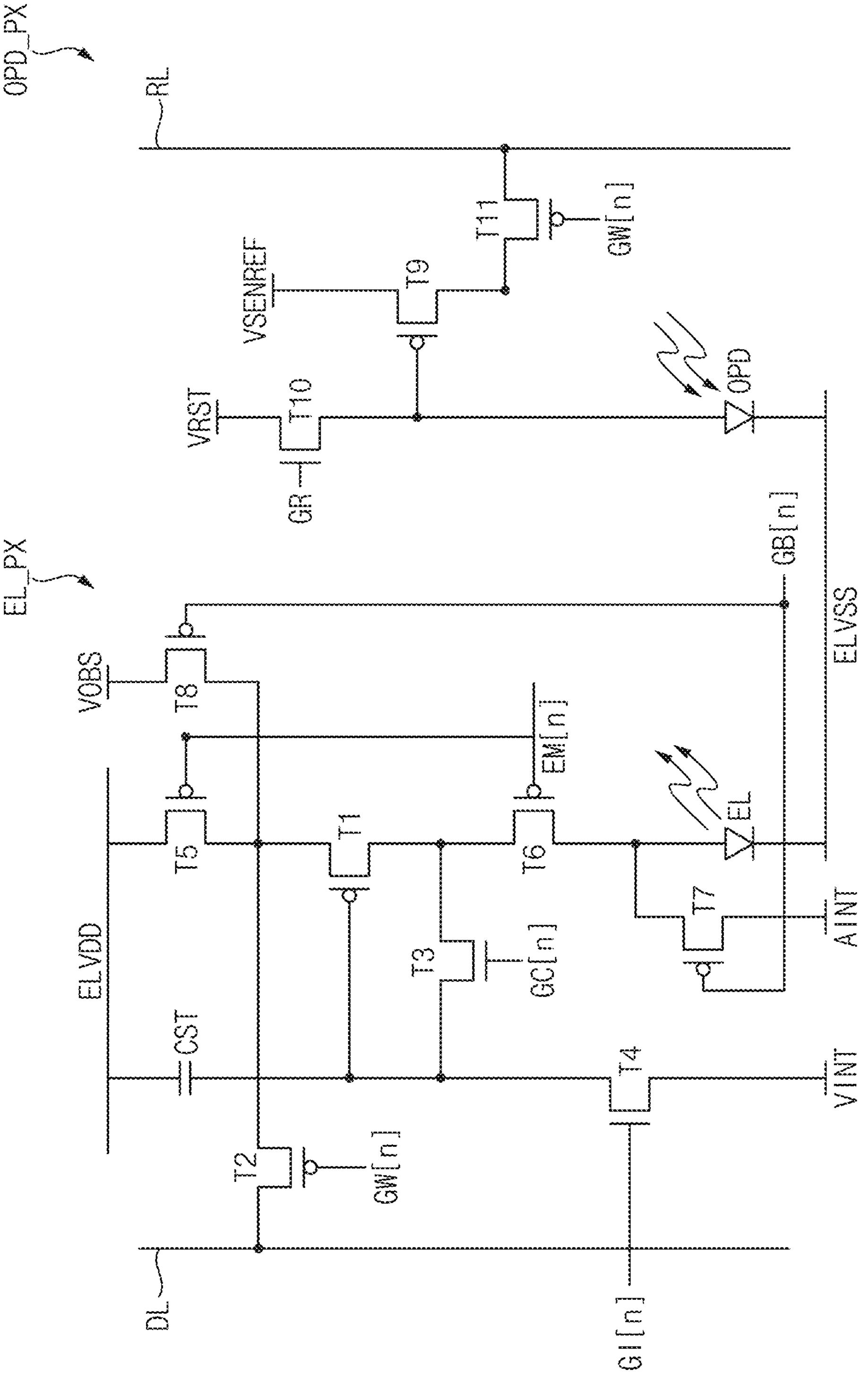
FIG. 2 is a circuit diagram illustrating an example of a light-emitting pixel and a light-sensing pixel included in a display device according to embodiments.

FIG. 2 is a circuit diagram illustrating an example of a light-emitting pixel and a light-sensing pixel included in a display device according to embodiments.

Referring to FIG. 2, the light-emitting pixel EL_PX may include a first transistor T1, a second transistor T2, a third transistor T3, a fourth transistor T4, a fifth transistor T5, a sixth transistor T6, a seventh transistor T7, an eighth transistor T8, a storage capacitor CST and a light-emitting element EL.

The first transistor T1 may generate a driving current based on a voltage stored in the storage capacitor CST. In some embodiments, the first transistor T1 may include a gate connected to the storage capacitor CST, a first terminal connected to the fifth transistor T5, and a second terminal connected to the sixth transistor T6.

The second transistor T2 may transfer the data signal DS of a data line DL to the first terminal of the first transistor T1 in response to a write signal GW [n]. In some embodiments, the second transistor T2 may include a gate that receives the write signal GW[n], a first terminal connected to the data line DL, and a second terminal connected to the first terminal of the first transistor T1.

The third transistor T3 may diode-connect the first transistor T1 in response to a compensation signal GC[n]. In some embodiments, the third transistor T3 may include a gate that receives the compensation signal GC[n], a first terminal connected to the second terminal of the first transistor T1, and a second terminal connected to the gate of the first transistor T1.

The fourth transistor T4 may transfer an initialization voltage VINT to the gate of the first transistor T1 in response to an initialization signal GI[n]. In some embodiments, the fourth transistor T4 may include a gate that receives the initialization signal GI[n], a first terminal connected to the gate of the first transistor T1, and a second terminal connected to a line that transfers the initialization voltage VINT.

The fifth transistor T5 may connect a line that transfers a first power supply voltage ELVDD (e.g., a high power supply voltage) and the first transistor T1 in response to an emission signal EM[n]. In some embodiments, the fifth transistor T5 may include a gate that receives the emission signal EM[n], a first terminal connected to the line that transfers the first power supply voltage ELVDD, and a second terminal connected to the first terminal of the first transistor T1.

The sixth transistor T6 may connect the first transistor T1 and the light-emitting element EL in response to the emission signal EM[n]. In some embodiments, the sixth transistor T6 may include a gate that receives the emission signal EM[n], a first terminal connected to the second terminal of the first transistor T1, and a second terminal connected to an anode of the light-emitting element EL.

The seventh transistor T7 may transfer an anode initialization voltage AINT to the light-emitting element EL in response to a bypass signal GB[n]. In some embodiments, the seventh transistor T7 may include a gate that receives the bypass signal GB[n], a first terminal connected to the anode of the light-emitting element EL, and a second terminal connected to a line that transfers the anode initialization voltage AINT. In some embodiments, the initialization voltage VINT and the anode initialization voltage AINT may be different voltages. In other embodiments, the initialization voltage VINT and the anode initialization voltage AINT may be the same voltage.

The eighth transistor T8 may transfer a bias voltage VOBS to the first terminal of the first transistor T1 in response to the bypass signal GB[n]. The first transistor T1 may have an on-state based on the bias voltage VOBS. In some embodiments, the eighth transistor T8 may include a gate that receives the bypass signal GB[n], a first terminal connected to a line that transfers the bias voltage VOBS, and a second terminal connected to the first terminal of the first transistor T1.

The storage capacitor CST may be connected between the line that transfers the first power supply voltage ELVDD and the gate of the first transistor T1. In some embodiments, the storage capacitor CST may include a first electrode connected to the line that transfers the first power supply voltage ELVDD, and a second electrode connected to the gate of the first transistor T1.

The light-emitting element EL may emit light based on the driving current generated by the first transistor T1. In some embodiments, the light-emitting element EL may be, but is not limited to, an organic light-emitting diode (OLED). In other embodiments, the light-emitting element EL may be a nano light-emitting diode (NED), a quantum dot (QD) light-emitting diode, a micro light-emitting diode, an inorganic light-emitting diode, or any other suitable light-emitting element. In some embodiments, the light-emitting element EL may include the anode connected to the sixth transistor T6, and a cathode connected to a line that transfers a second power supply voltage ELVSS (e.g., a low power supply voltage).

In some embodiments, the first through eighth transistors T1 through T8 may be P-type metal-oxide-semiconductor (PMOS) transistors. In other embodiments, the first through eighth transistors T1 through T8 may be N-type metal-oxide-semiconductor (NMOS) transistors. In still other embodiments, one or more of the first through eighth transistors T1 through T8 may be PMOS transistors, and one or more others of the first through eighth transistors T1 through T8 may be NMOS transistors. For example, as illustrated in FIG. 2, the first, second, fifth, sixth, seventh and eighth transistors T1, T2, T5, T6, T7 and T8 may be PMOS transistors, and the third and fourth transistors T3 and T4 may be NMOS transistors, but are not limited thereto. Although FIG. 2 illustrates an example in which the light-emitting pixel EL_PX has an 8T1C structure including eight transistors T1 through T8 and one capacitor CST, a structure of the light-emitting pixel EL_PX of the display device 100 according to embodiments is not limited to the example of FIG. 2.

Further, for example, as illustrated in FIG. 2, the light-sensing pixel OPD_PX may include a ninth transistor T9, a tenth transistor T10, an eleventh transistor T11 and an organic photodiode OPD.

The ninth transistor T9 may generate a sensing current based on an anode voltage (or a voltage of an anode) of the organic photodiode OPD. In some embodiments, the ninth transistor T9 may include a gate connected to the anode of the organic photodiode OPD, a first terminal that receives a sensing reference voltage VSENREF, and a second terminal. In some embodiments, the sensing reference voltage VSENREF may have a voltage level substantially the same as a voltage level of the anode initialization voltage AINT, but is not limited thereto.

The tenth transistor T10 may reset the organic photodiode OPD (or the anode voltage of the organic photodiode OPD) to a reset voltage VRST in response to a global reset signal GR. In some embodiments, the tenth transistor T10 may include a gate that receives the global reset signal GR, a first terminal that receives the reset voltage VRST, and a second terminal connected to the anode of the organic photodiode OPD.

The eleventh transistor T11 may transfer the sensing current generated by the ninth transistor T9 to the readout line RL in response to the write signal GW[n]. In some embodiments, the eleventh transistor T11 may include a gate that receives the write signal GW[n], a first terminal connected to the second terminal of the ninth transistor T9, and a second terminal connected to the readout line RL.

The organic photodiode OPD may be used to measure light intensity. For example, after the anode voltage of the organic photodiode OPD is reset to the reset voltage VRST, an increase in the anode voltage of the organic photodiode OPD may depend on the light intensity. The sensing current of the ninth transistor T9 may be determined according to the anode voltage of the organic photodiode OPD, and the readout circuit 150 may generate a digital sensing signal DSS (see FIG. 4) corresponding to the sensing current. In some embodiments, the organic photodiode OPD may include the anode connected to the gate of the ninth transistor T9, and a cathode connected to the line that transfers the second power supply voltage ELVSS.

In some embodiments, the ninth through eleventh transistors T9 through T11 may be PMOS transistors. In other embodiments, the ninth through eleventh transistors T9 through T11 may be NMOS transistors. In still other embodiments, one or more of the ninth through eleventh transistors T9 through T11 may be PMOS transistors, and one or more others of the ninth through eleventh transistors T9 through T11 may be NMOS transistors. For example, as illustrated in FIG. 2, the ninth and eleventh transistors T9 and T11 may be PMOS transistors, and the tenth transistor T10 may be an NMOS transistor, but are not limited thereto. Although FIG. 2 illustrates an example in which the light-sensing pixel OPD_PX has a 3T1D structure including three transistors T9 through T1 and one diode OPD, a structure of the light-sensing pixel OPD_PX of the display device 100 according to embodiments is not limited to the example of FIG. 2.

In some embodiments, the display panel 110 may include one light-sensing pixel OPD_PX per each light-emitting pixel EL_PX. In other embodiments, the display panel 110 may include one light-sensing pixel OPD_PX per a plurality of light-emitting pixels EL_PX. For example, the display panel 110 may include one light-sensing pixel OPD_PX per four light-emitting pixels EL_PX.

Figure 3:
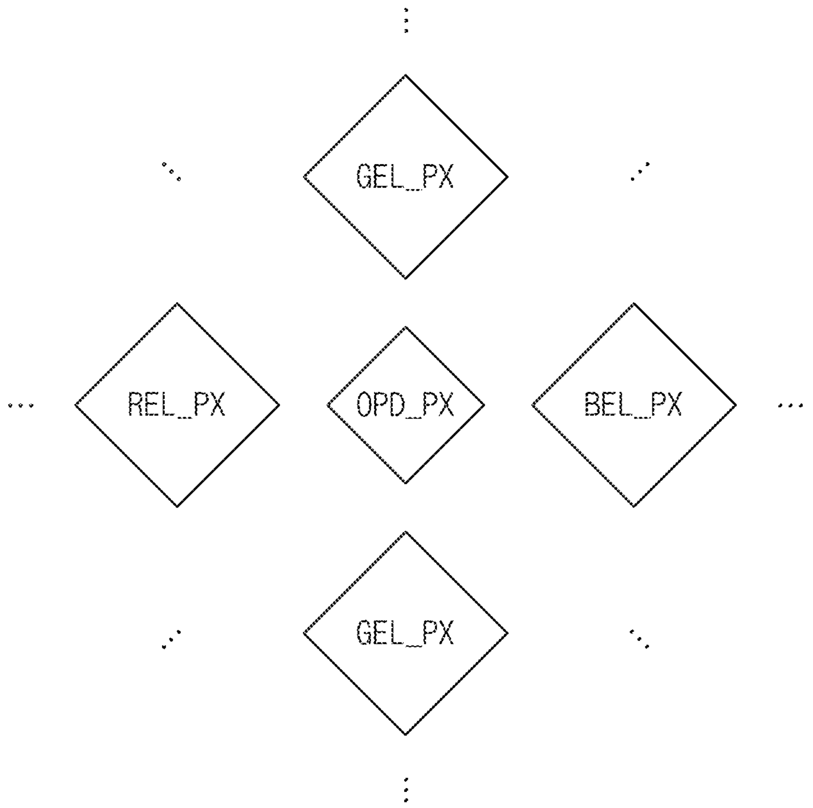
FIG. 3 is a diagram for describing an example of an arrangement of light-emitting pixels and light-sensing pixels.

FIG. 3 is a diagram for describing an example of an arrangement of light-emitting pixels and light-sensing pixels.

Referring to FIG. 3, in one example, in the display panel 110, one red light-emitting pixel REL_PX, two green light-emitting pixels GEL_PX, and one blue light-emitting pixel BEL_PX may be arranged in a diamond shape, and one light-sensing pixel OPD_PX may be arranged among four light-emitting pixels REL_PX, GEL_PX, and BEL_PX arranged in the diamond shape, but are not limited thereto.

As shown in FIG. 1, the scan driver 120 may generate the scan signals SS based on a scan control signal SCTRL received from the controller 160, and may sequentially provide the scan signals SS to the display panel 110 on a row-by-row basis. The scan control signal SCTRL may include, but is not limited to, a scan start signal and a scan clock signal. In some embodiments, the scan driver 120 may generate, as the scan signals, the write signal GW[n], the compensation signal GC[n], the initialization signal GI[n], and the bypass signal GB[n] illustrated in FIG. 2, and provide the write signal GW[n], the compensation signal GC[n], the initialization signal GI[n], and the bypass signal GB[n] to the light-emitting pixel EL_PX, and may provide the write signal GW[n] to the light-sensing pixel OPD_PX. Further, in some embodiments, the scan driver 120 may be integrated or formed in the display panel 110. In other embodiments, the scan driver 120 may be implemented as one or more integrated circuits.

The emission driver 130 may generate the emission signals EM[n] based on an emission control signal EMCTRL received from the controller 160, and may sequentially provide the emission signals EM[n] to the display panel 110 on a row-by-row basis. The emission control signal EMCTRL can include, but is not limited to, an emission start signal and an emission clock signal. In some embodiments, the emission driver 130 may be integrated or formed in the display panel 110. In other embodiments, the emission driver 130 may be implemented as one or more integrated circuits.

The data driver 140 may generate the data signals DS based on a data control signal DCTRL, and may output image data ODAT received from the controller 160, and may provide the data signals DS to the light-emitting pixels EL_PX through the data lines DL. The data control signal DCTRL may include, but is not limited to, an output data enable signal, a horizontal start signal, and a load signal. In some embodiments, the data driver 140 and the controller 160 may be implemented as a single integrated circuit, and the single integrated circuit may be referred to as a timing controller embedded data driver (TED) integrated circuit. In other embodiments, the data driver 140 and the controller 160 may be implemented as separate integrated circuits.

The readout circuit 150 may receive sensing currents of the light-sensing pixels OPD_PX through the readout lines RL, may generate a digital sensing signal DSS based on the sensing currents, and may provide the digital sensing signal DSS to the controller 160. Further, the readout circuit 150 may substantially simultaneously apply the global reset signal GR to all the light-sensing pixels OPD_PX of the display panel 110. In some embodiments, the readout circuit 150 may provide the reset voltage VRST to the light-sensing pixels OPD_PX.

Figure 4:
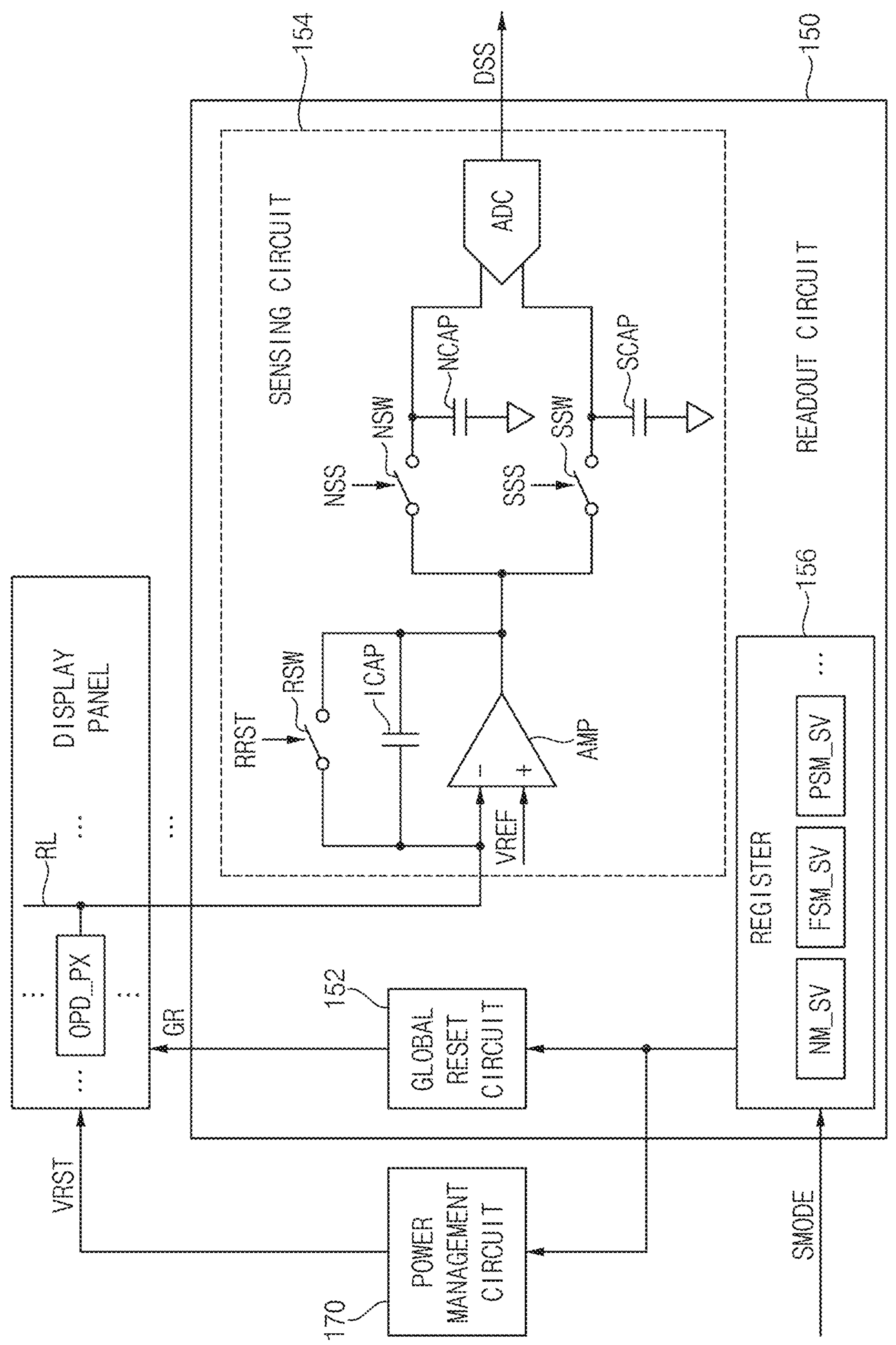
FIG. 4 is a diagram illustrating an example of a readout circuit included in a display device according to embodiments.

FIG. 4 is a diagram illustrating an example of a readout circuit included in a display device according to embodiments.

Referring to FIG. 4, in other embodiments, the display device 100 may further include a power management circuit 170 that generates voltages required for the operation of the display device 100, and the reset voltage VRST provided to the light-sensing pixels OPD_PX may be generated by the power management circuit. In some embodiments, the readout circuit 150 may be implemented as an integrated circuit, and the integrated circuit may be referred to as a read-out integrated circuit (ROIC). In other embodiments, the readout circuit 150 may be included in the data driver 140.

The readout circuit 150 may include a global reset circuit 152, a sensing circuit 154, and a register 156.

The global reset circuit 152 may generate the global reset signal GR provided to the light-sensing pixels OPD_PX of the display panel 110. In some embodiments, the global reset signal GR may be substantially simultaneously provided to all the light-sensing pixels OPD_PX of the display panel 110.

The sensing circuit 154 may receive the sensing current of the light-sensing pixel OPD_PX through the readout line RL, and may generate the digital sensing signal DSS corresponding to the sensing current. For example, as illustrated in FIG. 4, the sensing circuit 154 may include an amplifier AMP, an integrating capacitor ICAP, a reset switch RSW, a noise capacitor NCAP, a noise switch NSW, a signal capacitor SCAP, a signal switch SSW, a signal capacitor SCAP, and an analog-to-digital converter ADC. The amplifier AMP may include an inverting input terminal connected to the readout line RL, a non-inverting input terminal that receives a reference voltage VREF, and an output terminal. The integrating capacitor ICAP may be connected between the inverting input terminal and the output terminal of the amplifier AMP. The reset switch RSW may reset the integrating capacitor ICAP in response to a readout reset signal RRST. The noise capacitor NCAP may store a noise voltage output from the amplifier AMP. The noise switch NSW may selectively connect the output terminal of the amplifier AMP and the noise capacitor NCAP in response to a noise switching signal NSS. The signal capacitor SCAP may store a signal voltage output from the amplifier AMP. The signal switch SSW may selectively connect the output terminal of the amplifier AMP and the signal capacitor SCAP in response to a signal switching signal SSS. The analog-to-digital converter ADC may generate the digital sensing signal DSS based on a difference between the noise voltage stored in the noise capacitor NCAP and the signal voltage stored in the signal capacitor SCAP.

The register 156 may store setting values NM_SV, FSM_SV, and PSM_SV for the global reset signal GR and the reset voltage VRST in a normal mode, in a first sensing mode, and in a second sensing mode. In some embodiments, the first sensing mode may be a fingerprint-sensing mode, the second sensing mode may be a photoplethysmography (PPG)-sensing mode, and the register 156 may store the setting value NM_SV for the normal mode, may store the setting value FSM_SV for the fingerprint-sensing mode, and may store the setting value PSM_SV for the PPG-sensing mode.

For, the register 156 may receive a mode signal SMODE indicating the normal mode, the fingerprint-sensing mode, or the PPG-sensing mode from an external host processor (e.g., via the controller 160), and may provide the setting value NM_SV, FSM_SV, and PSM_SV corresponding to a driving mode indicated by the mode signal SMODE to the global reset circuit 152 and/or the power management circuit 170. The global reset circuit 152 may change at least one of a voltage level, a timing, a waveform, or a slew rate of the global reset signal GR based on the setting value NM_SV, FSM_SV, and PSM_SV received from the register 156. Further, the power management circuit 170 may change a voltage level of the reset voltage VRST based on the setting value NM_SV, FSM_SV, and PSM_SV received from the register 156.

In some embodiments, the power management circuit 170 may be included in the ROIC in which the readout circuit 150 is implemented. In other embodiments, the power management circuit 170 may be implemented as an integrated circuit other than the ROIC, and such an integrated circuit may be referred to as a power management integrated circuit (PMIC).

The controller 160 (e.g., a timing controller (TCON)) may receive input image data IDAT and a control signal CTRL from an external host processor (e.g., a graphics processing unit (GPU), an application processor (AP), or a graphics card). In some embodiments, the input image data IDAT may be RGB image data including red image data, green image data, and blue image data. The control signal CTRL may include the mode signal SMODE indicating a driving mode of the display device 100. In some embodiments, the mode signal SMODE may indicate the normal mode, the first sensing mode (e.g., the fingerprint-sensing mode), or the second sensing mode (e.g., the PPG-sensing mode). The controller 160 may provide the mode signal SMODE received from the external host processor to the readout circuit 150. In some embodiments, the control signal CTRL may further include, but is not limited to, a vertical synchronization signal, a horizontal synchronization signal, an input data enable signal, a master clock signal, etc. The controller 160 may generate the output image data ODAT, the data control signal DCTRL, the scan control signal SCTRL, and the emission control signal EMCTRL based on the input image data IDAT and the control signal CTRL. The controller 160 may control an operation of the data driver 140 by providing the output image data ODAT and the data control signal DCTRL to the data driver 140, may control an operation of the scan driver 120 by providing the scan control signal SCTRL to the scan driver 120, and may control an operation of the emission driver 130 by providing the emission control signal EMCTRL to the emission driver 130.

Figure 5A:
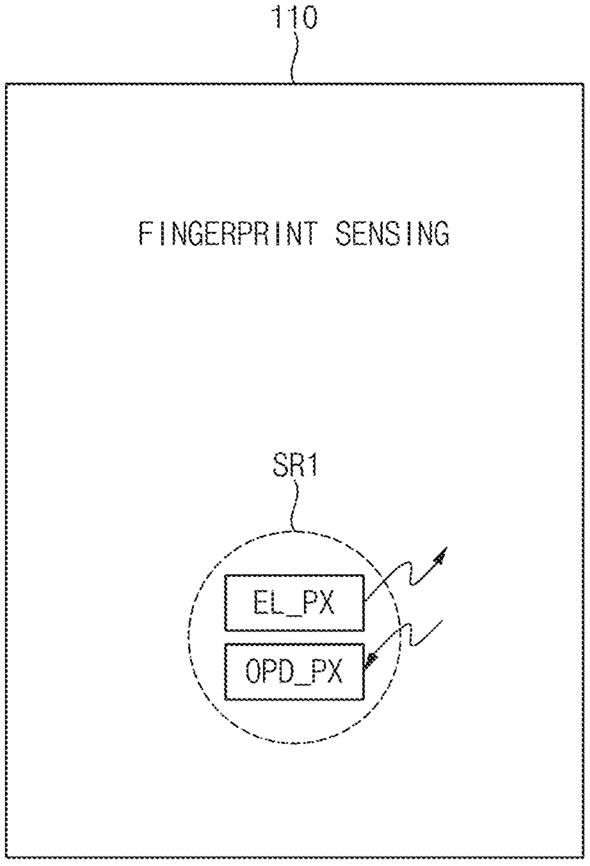
FIG. 5A and FIG. 5B are diagrams for describing an example of a sensing operation in a fingerprint-sensing mode in a display device according to embodiments.
Figure 5B:
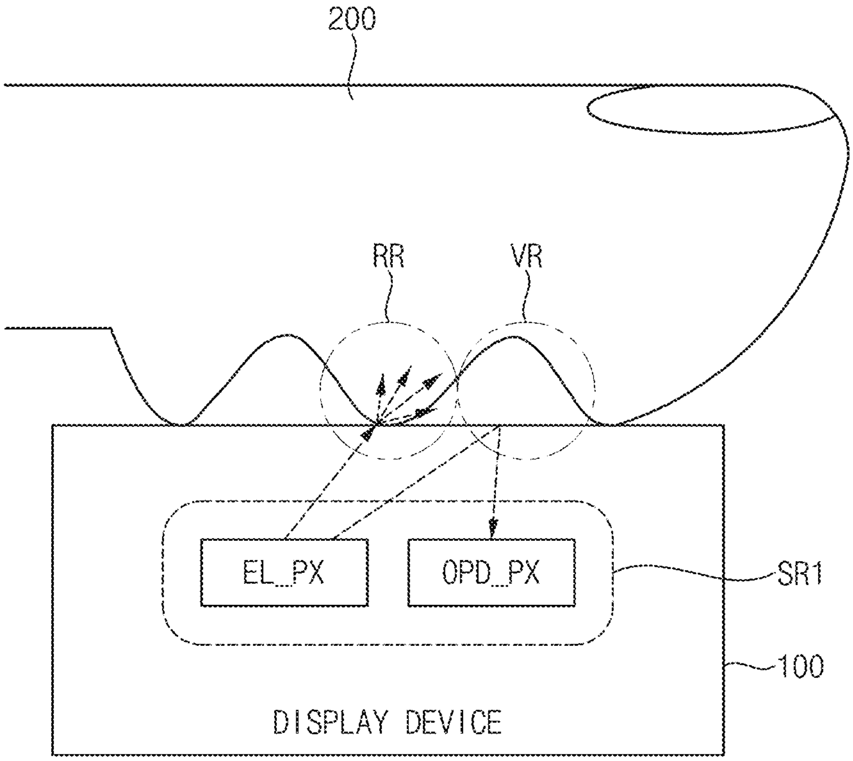
Figure 6A:
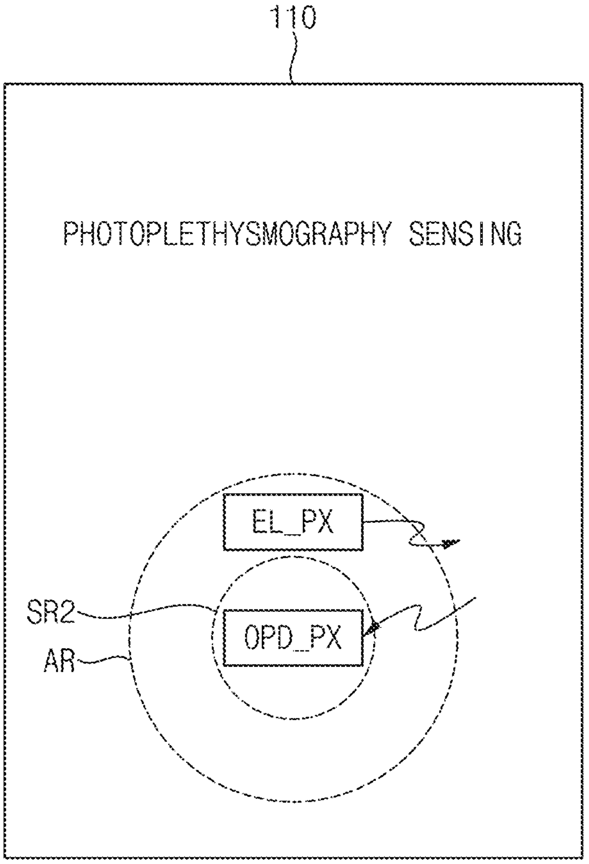
FIG. 6A and FIG. 6B are diagrams for describing an example of a sensing operation in a photoplethysmography-sensing mode in a display device according to embodiments.
Figure 6B:
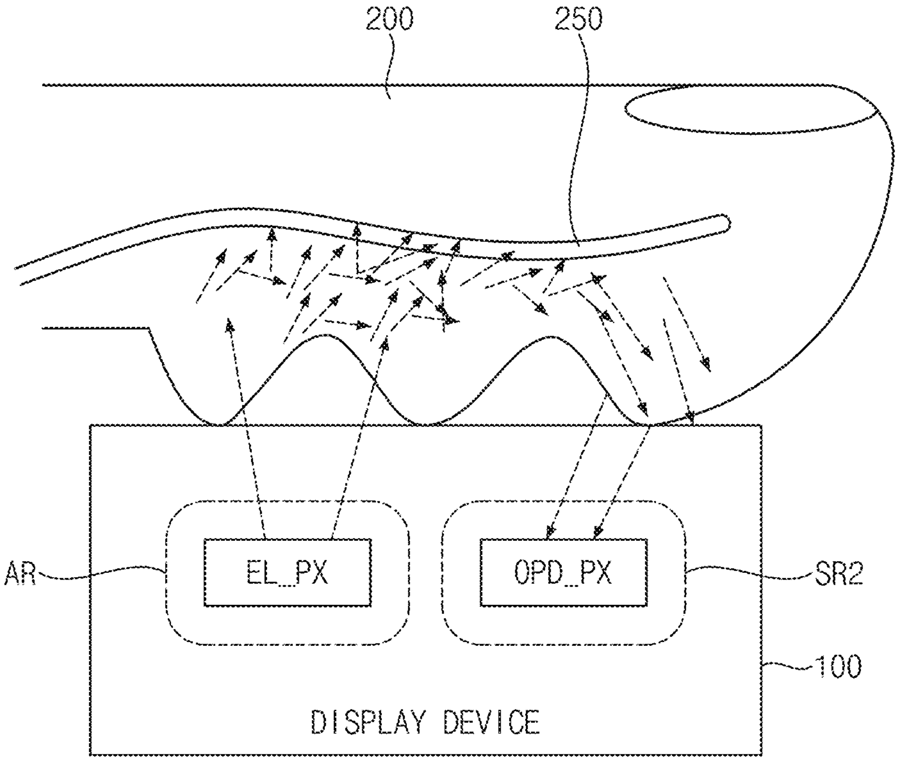

FIG. 5A and FIG. 5B are diagrams for describing an example of a sensing operation in a fingerprint-sensing mode in a display device according to embodiments, and FIG. 6A and FIG. 6B are diagrams for describing an example of a sensing operation in a PPG-sensing mode in a display device according to embodiments.

Referring to FIGS. 5A, 5B, 6A, and 6B, the display device 100 according to embodiments may perform different sensing operations in a plurality of sensing modes. In some embodiments, the plurality of sensing modes include the fingerprint-sensing mode and the PPG-sensing mode, the display device 100 may perform a sensing operation that senses a fingerprint of a user in the fingerprint-sensing mode, and the display device 100 may perform a sensing operation that senses a volume of a blood vessel of a finger of the user in the PPG-sensing mode.

For example, in the fingerprint-sensing mode, as illustrated in FIGS. 5A and 5B, the display device 100 may drive the light-emitting pixels EL_PX within a first sensing region SR1 of the display panel 110, such that the light-emitting pixels EL_PX within the first sensing region SR1 emit light. Here, the first sensing region SR1 may be a region of the display panel 110 on which the finger 200 is placed to sense the fingerprint. Light emitted from the light-emitting pixel EL_PX arranged corresponding to a ridge region RR of the fingerprint of the finger 200 may be transmitted into the ridge region RR, but light emitted from the light-emitting pixel EL_PX arranged corresponding to a valley region VR of the fingerprint of the finger 200 may be reflected from the valley region VR (or from a surface of the display panel 110 corresponding to the valley region VR). Each light-sensing pixel OPD_PX within the first sensing region SR1 may generate the sensing current by sensing light that is generated from the light-emitting pixel EL_PX immediately adjacent to the light-sensing pixel OPD_PX, and that is reflected from the fingerprint of the finger 200. The readout circuit 150 may generate the digital sensing signal DSS representing the fingerprint of the finger 200 based on the sensing currents of the light-sensing pixels OPD_PX within the first sensing region SR1.

Further, in the PPG-sensing mode, as illustrated in FIGS. 6A and 6B, the display device 100 may drive the light-emitting pixels EL_PX within an adjacent region AR that is adjacent to a second sensing region SR2 of the display panel 110, such that the light-emitting pixels EL_PX within the adjacent region AR emit light. Here, the second sensing region SR2 may be a region of the display panel 110 on which the finger 200 is placed to sense a volume of a blood vessel 250 of the finger 200, and the adjacent region AR may be a region surrounding the second sensing region SR2, but are not limited thereto. Further, in some embodiments, the second sensing region SR2 may be substantially the same as the first sensing region SR1, but is not limited thereto. Light emitted from the light-emitting pixels EL_PX within the adjacent region AR may be reflected from the blood vessel 250 of the finger 200. The light-sensing pixels OPD_PX within the second sensing region SR2 may sense the light reflected from the blood vessel 250. Further, an intensity of the light reflected from the blood vessel 250 may vary depending on the volume of the blood vessel 250. For example, when a heart of the user contracts, and the volume of the blood vessel 250 increases, the number or amount of hemoglobin in the blood vessel 250 may increase, the light intensity of the light-emitting pixels EL_PX absorbed by the hemoglobin may increase, and the light-sensing pixels OPD_PX may receive reflected light having relatively low intensity. In contrast, when the heart of the user relaxes, and the volume of the blood vessel 250 decreases, the number or amount of hemoglobin in the blood vessel 250 may decrease, the light intensity of the light-emitting pixel EL_PX absorbed by the hemoglobin may decrease, and the light-sensing pixel OPD_PX may receive reflected light having relatively high intensity. The light-sensing pixels OPD_PX within the second sensing region SR2 may generate the sensing currents corresponding to the intensity of the reflected light, and the readout circuit 150 may generate, as the digital sensing signal DSS, a photoplethysmography signal representing the volume of the blood vessel 250 over time based on the sensing currents of the light-sensing pixels OPD_PX within the second sensing region SR2. In some embodiments, the controller 160 may determine a biomarker of the user based on the photoplethysmography signal. For example, the controller 160 may determine a blood pressure, a heart rate, a stress level, a cardiovascular health, a respiratory rate, a blood vessel age (or blood vessel elasticity), and/or an oxygen saturation of the user based on the photoplethysmography signal, but is not limited thereto.

Further, the display device 100 according to embodiments may change at least one of the global reset signal GR or the reset voltage VRST between the plurality of sensing modes. In some embodiments, the readout circuit 150 may change the voltage level of the reset voltage VRST between the fingerprint-sensing mode and the PPG-sensing mode. In other embodiments, the readout circuit 150 may change the voltage level of the global reset signal GR between the fingerprint-sensing mode and the PPG-sensing mode. In still other embodiments, the readout circuit 150 may change the timing of the global reset signal GR between the fingerprint-sensing mode and the PPG-sensing mode. In still other embodiments, the readout circuit 150 may change the waveform of the global reset signal GR between the fingerprint-sensing mode and the PPG-sensing mode. In still other embodiments, the readout circuit 150 may change the slew rate of the global reset signal GR between the fingerprint-sensing mode and the PPG-sensing mode. Accordingly, in the display device 100 according to the embodiments, driving conditions (e.g., the voltage level, the timing, etc.) may be improved or optimized in the respective sensing modes, and the sensing operations may be more accurately performed in the respective sensing modes (e.g., the fingerprint-sensing mode and the PPG-sensing mode).

Figure 7:
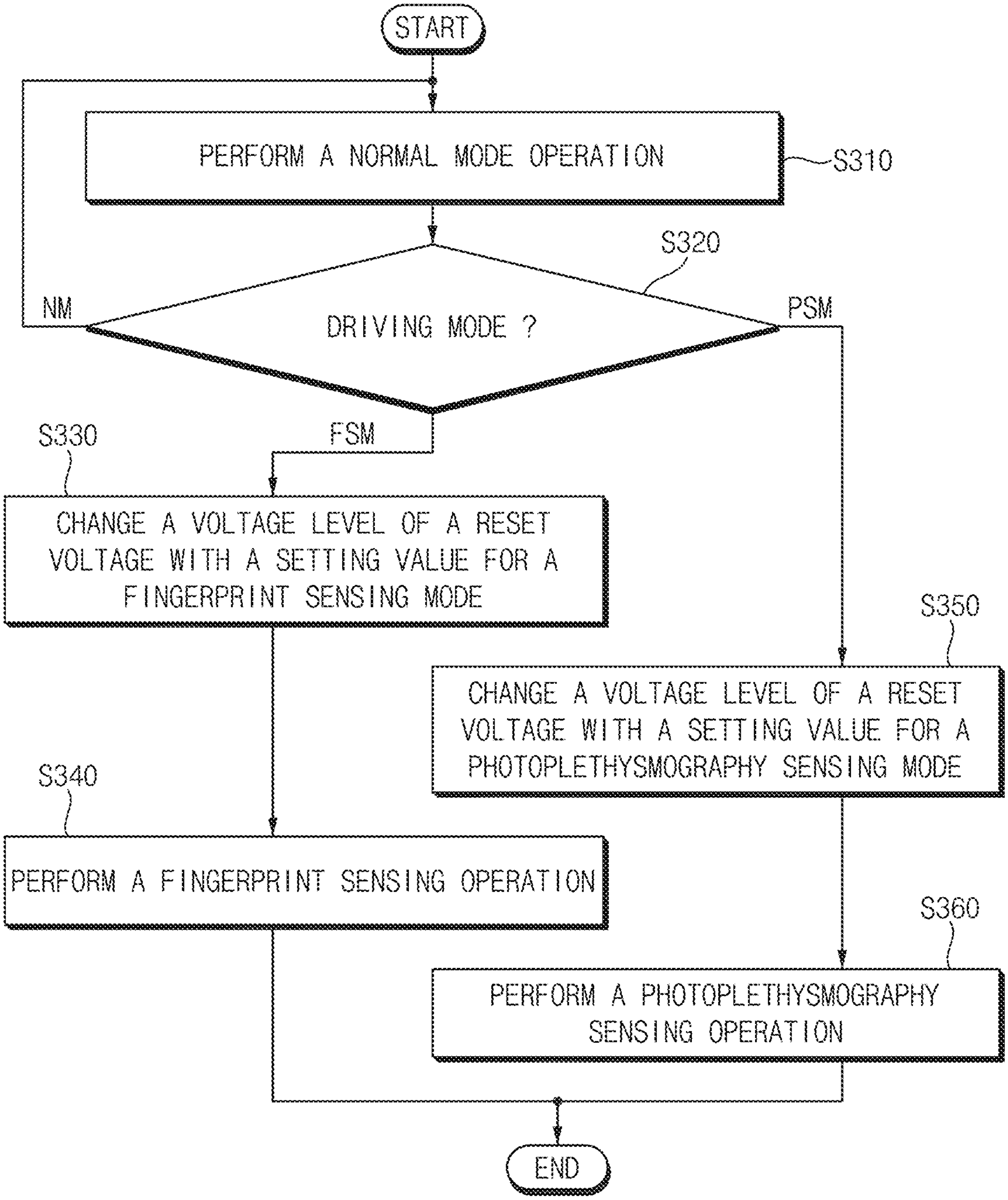
FIG. 7 is a flowchart illustrating a method of operating a display device according to embodiments.

FIG. 7 is a flowchart illustrating a method of operating a display device according to embodiments, and FIG. 8 is a diagram illustrating an example of a voltage level of a reset voltage in a normal mode, a fingerprint-sensing mode, and a PPG-sensing mode.

Referring to FIGS. 1 and 7, a display device 100 may perform a normal mode operation that displays an image by driving light-emitting pixels EL_PX (S310). For example, a scan driver 120 may provide scan signals SS to the light-emitting pixels EL_PX, a data driver 140 may provide data signals DS to the light-emitting pixels EL_PX, and the light-emitting pixels EL_PX may display an image based on the scan signals SS and the data signals DS.

The display device 100 may receive a mode signal SMODE indicating a driving mode of the display device 100 from an external host processor (S320). For example, the mode signal SMODE may indicate, as the driving mode, a normal mode NM, a fingerprint-sensing mode FSM, or a PPG-sensing mode PSM. When the mode signal SMODE indicates the normal mode NM (S320: NM), the display device 100 may perform the normal mode operation (S310).

When the mode signal SMODE indicates the fingerprint-sensing mode FSM (S320: FSM), the display device 100 may change a voltage level of a reset voltage VRST provided to light-sensing pixels OPD_PX with a setting value for the fingerprint-sensing mode FSM (S330), and may perform a fingerprint-sensing operation based on the reset voltage VRST of which the voltage level is changed (S340). Further, when the mode signal SMODE indicates the PPG-sensing mode PSM (S320: PSM), the display device 100 may change the voltage level of the reset voltage VRST provided to the light-sensing pixels OPD_PX with a setting value for the PPG-sensing mode PSM (S350), and may perform a PPG-sensing operation based on the reset voltage VRST of which the voltage level is changed (S360). That is, a readout circuit 150 of the display device 100 may change the voltage level of the reset voltage VRST among the normal mode NM, the fingerprint-sensing mode FSM, and the PPG-sensing mode PSM.

In some embodiments, as illustrated in FIG. 8, in the normal mode NM, the readout circuit 150 may set the reset voltage VRST to a first voltage level (e.g., about −6.5 V). Further, in the fingerprint-sensing mode FSM, the readout circuit 150 may set the reset voltage VRST to a second voltage level (e.g., about −8.4 V), which is lower than the first voltage level. In addition, in the PPG-sensing mode PSM, the readout circuit 150 may set the reset voltage VRST to a third voltage level (e.g., about −4.7 V), which is higher than the first voltage level. Accordingly, the voltage level of the reset voltage VRST may be improved or optimized in each of the normal mode NM, the fingerprint-sensing mode FSM, and the PPG-sensing mode PSM. The fingerprint-sensing operation in the fingerprint-sensing mode FSM and the PPG-sensing operation in the PPG-sensing mode PSM may be more accurately performed.

Figure 9:
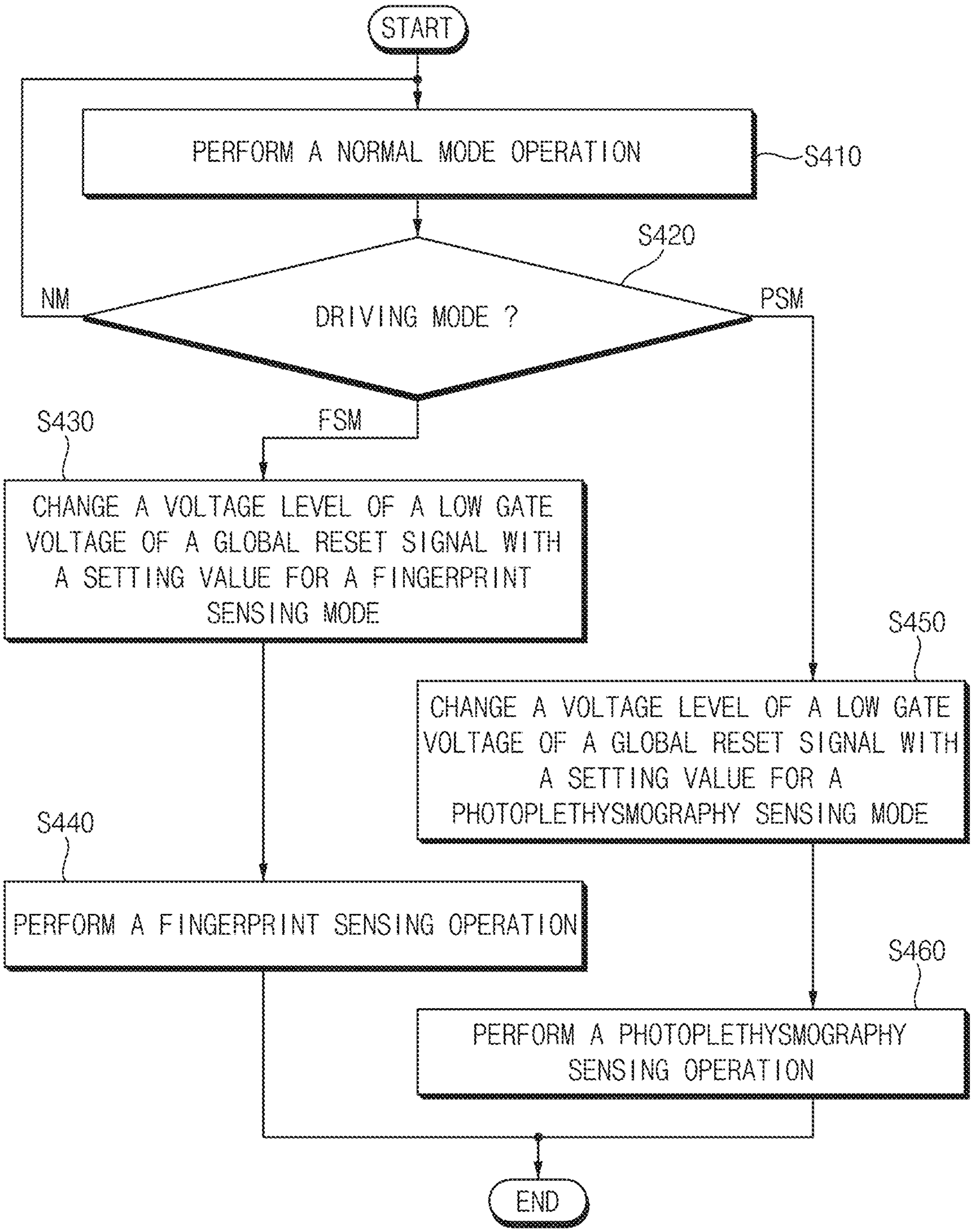
FIG. 9 is a flowchart illustrating a method of operating a display device according to embodiments.

FIG. 9 is a flowchart illustrating a method of operating a display device according to embodiments, and FIG. 10 is a diagram illustrating an example of a voltage level of a global reset signal in a normal mode, a fingerprint-sensing mode, and a PPG-sensing mode.

Referring to FIGS. 1 and 9, a display device 100 may perform a normal mode operation that displays an image by driving light-emitting pixels EL_PX (S410). Further, when a mode signal SMODE indicates a normal mode NM (S420: NM), the display device 100 may continue to perform the normal mode operation (S410).

When the mode signal SMODE indicates a fingerprint-sensing mode FSM (S420: FSM), the display device 100 may change a voltage level of a high gate voltage and/or a low gate voltage of a global reset signal GR provided to light-sensing pixels OPD_PX with a setting value for the fingerprint-sensing mode FSM (S430), and may perform a fingerprint-sensing operation based on the global reset signal GR of which the voltage level is changed (S440). Further, when the mode signal SMODE indicates a PPG-sensing mode PSM (S420: PSM), the display device 100 may change the voltage level of the high gate voltage and/or the low gate voltage of the global reset signal GR provided to the light-sensing pixels OPD_PX with a setting value for the PPG-sensing mode PSM (S450), and may perform a PPG-sensing operation based on the global reset signal GR of which the voltage level is changed (S460). That is, a readout circuit 150 of the display device 100 may change the voltage level of the high gate voltage and/or the low gate voltage of the global reset signal GR between the fingerprint-sensing mode FSM and the PPG-sensing mode PSM.

In some embodiments, as illustrated in FIG. 10, the high gate voltage VGH of the global reset signal GR may have a substantially constant voltage level (e.g., about 7 V) in the normal mode NM, the fingerprint-sensing mode FSM, and the PPG-sensing mode PSM. However, in the normal mode NM, the readout circuit 150 may set the low gate voltage VGL of the global reset signal GR to a first voltage level (e.g., about −8 V). Further, in the fingerprint-sensing mode FSM, the readout circuit 150 may set the low gate voltage VGL of the global reset signal GR to a second voltage level (e.g., about −9 V), which is lower than the first voltage level. In addition, in the PPG-sensing mode PSM, the readout circuit 150 may set the low gate voltage VGL of the global reset signal GR to the first voltage level (e.g., about −8 V). Accordingly, the voltage level of the global reset signal GR may be improved or optimized in each of the fingerprint-sensing mode FSM and the PPG-sensing mode PSM. The fingerprint-sensing operation in the fingerprint-sensing mode FSM and the PPG-sensing operation in the PPG-sensing mode PSM may be more accurately performed.

Figure 11:
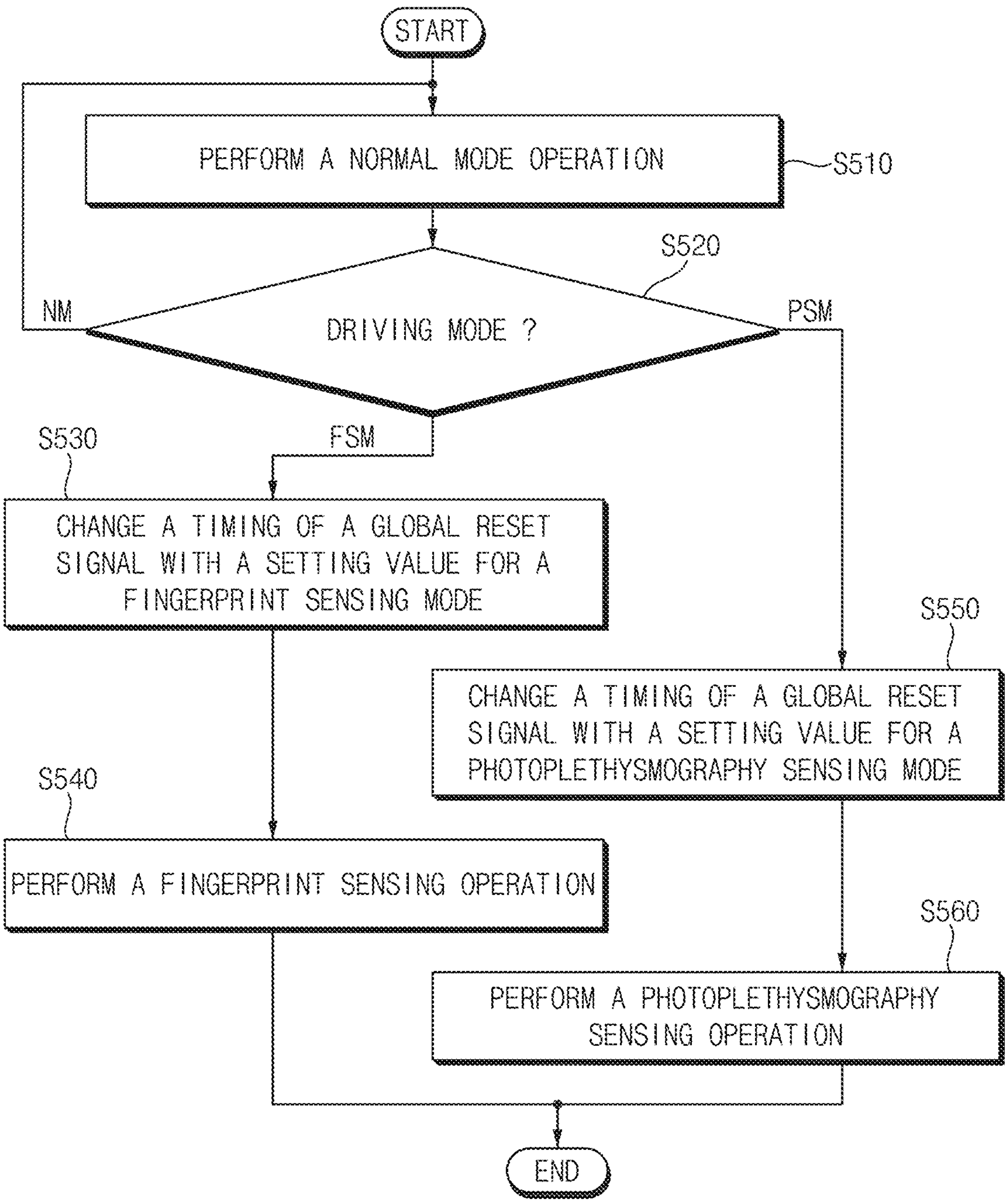
FIG. 11 is a flowchart illustrating a method of operating a display device according to embodiments.
Figure 12:
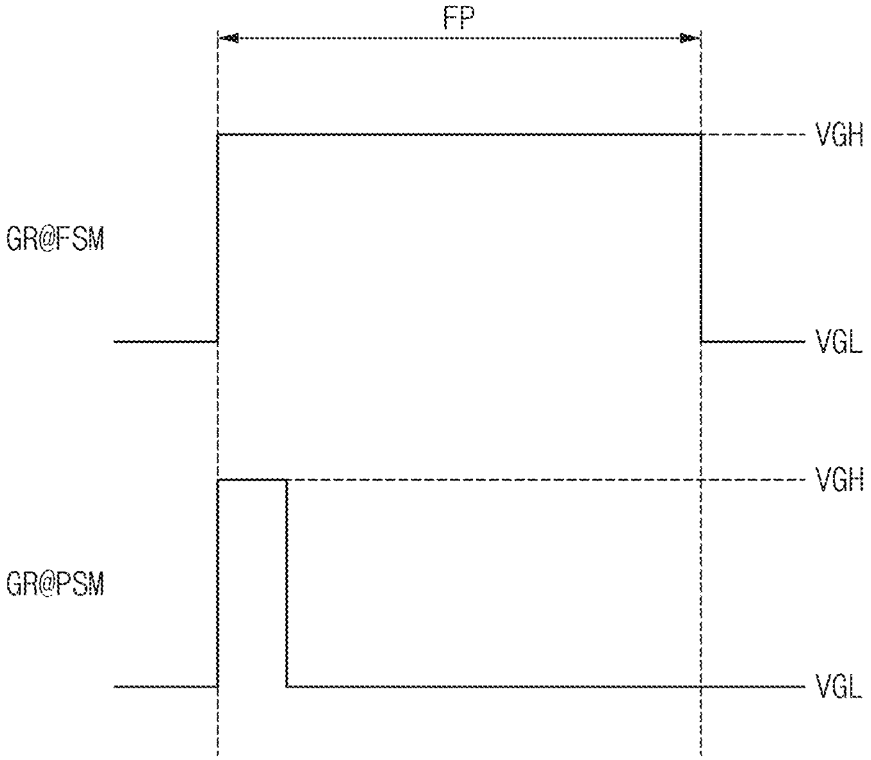
FIG. 12 is a timing diagram illustrating an example of a global reset signal in a fingerprint-sensing mode and a photoplethysmography-sensing mode.
Figure 13:
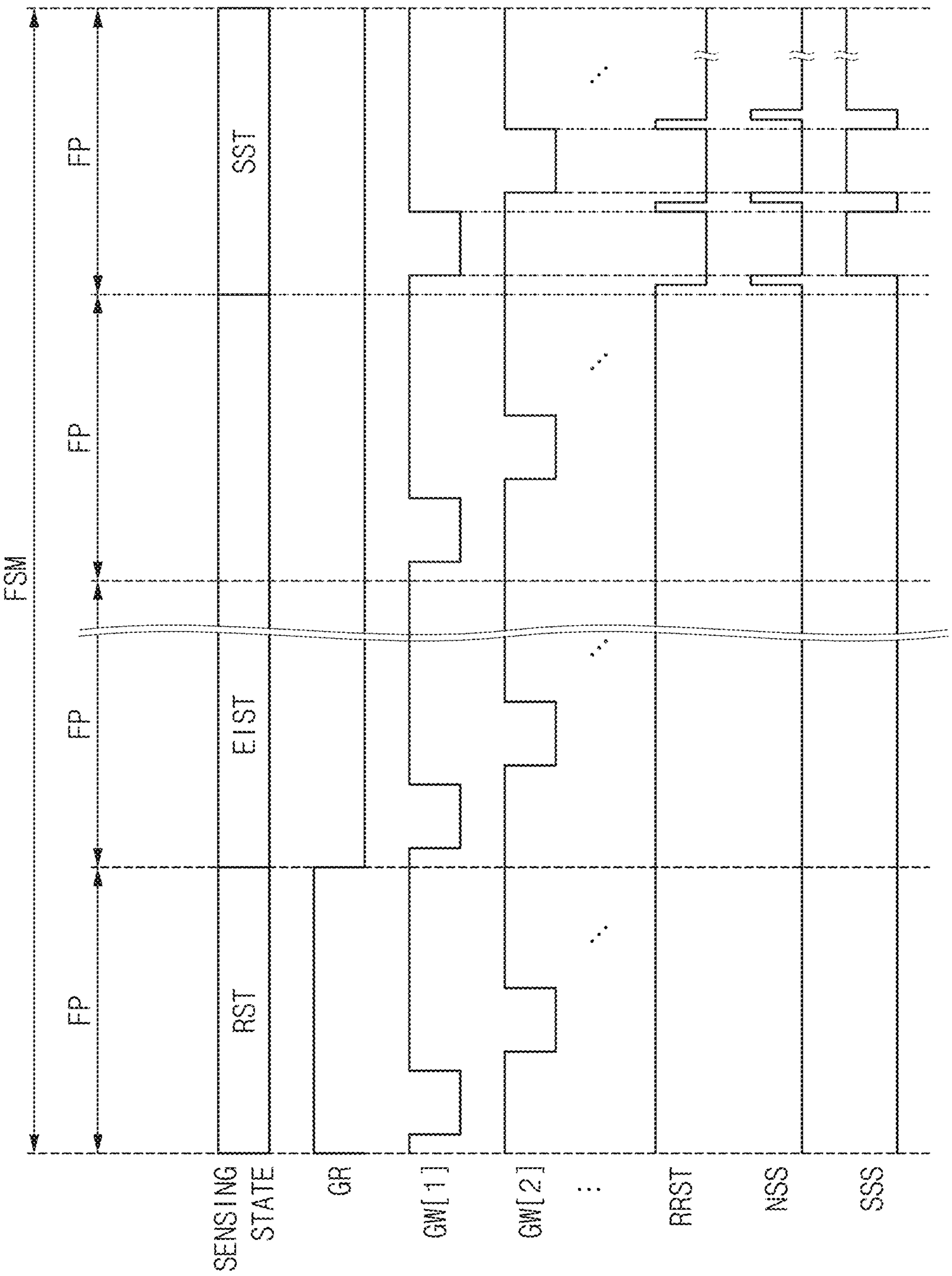
FIG. 13 is a timing diagram for describing an example of a sensing operation in a fingerprint-sensing mode in a display device according to embodiments.
Figure 14:
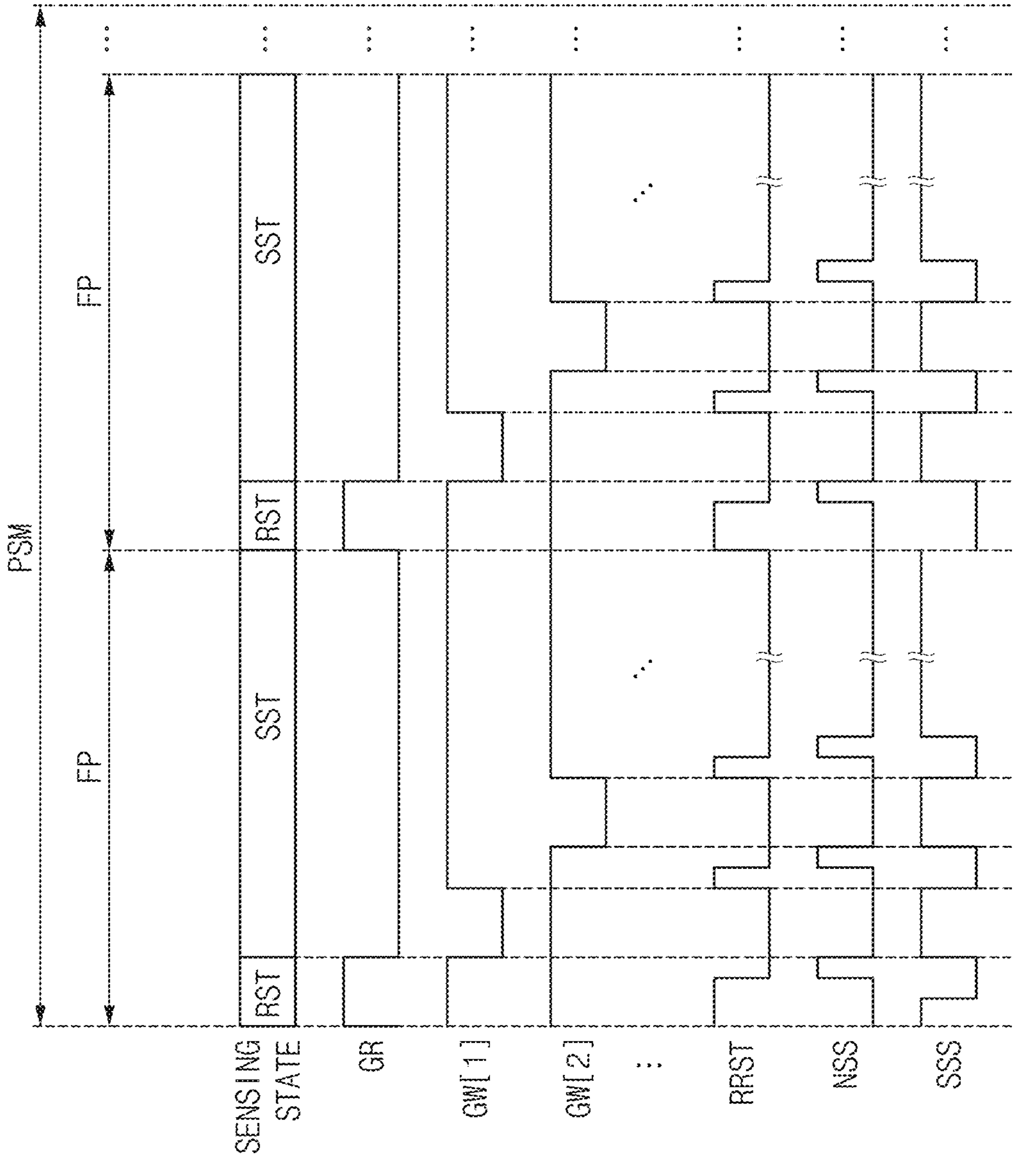
FIG. 14 is a timing diagram for describing an example of a sensing operation in a photoplethysmography-sensing mode in a display device according to embodiments.

FIG. 11 is a flowchart illustrating a method of operating a display device according to embodiments, FIG. 12 is a timing diagram illustrating an example of a global reset signal in a fingerprint-sensing mode and a PPG-sensing mode, FIG. 13 is a timing diagram for describing an example of a sensing operation in a fingerprint-sensing mode in a display device according to embodiments, and FIG. 14 is a timing diagram for describing an example of a sensing operation in a PPG-sensing mode in a display device according to embodiments.

Referring to FIG. 1 and FIG. 11, a display device 100 may perform a normal mode operation that displays an image by driving light-emitting pixels EL_PX (S510). Further, when a mode signal SMODE indicates a normal mode NM (S520: NM), the display device 100 may continue to perform the normal mode operation (S510).

When the mode signal SMODE indicates a fingerprint-sensing mode FSM (S520: FSM), the display device 100 may change a timing of a global reset signal GR provided to light-sensing pixels OPD_PX with a setting value for the fingerprint-sensing mode FSM (S530), and may perform a fingerprint-sensing operation based on the global reset signal GR of which the timing is changed (S540). Further, when the mode signal SMODE indicates a PPG-sensing mode PSM (S520: PSM), the display device 100 may change the timing of the global reset signal GR provided to the light-sensing pixels OPD_PX with the setting value for the PPG-sensing mode PSM (S550), and may perform a PPG-sensing operation based on the global reset signal GR of which the timing is changed (S560). That is, a readout circuit 150 of the display device 100 may change the timing of the global reset signal GR between the fingerprint-sensing mode FSM and the PPG-sensing mode PSM.

In some embodiments, as illustrated in FIG. 12, the readout circuit 150 may provide the global reset signal GR@FSM having a high gate voltage VGH to the light-sensing pixel OPD_PX during the entirety of one frame period FP in the fingerprint-sensing mode FSM, and may provide the global reset signal GR@PSM having the high gate voltage VGH during a portion of one frame period FP in the PPG-sensing mode PSM. That is, the global reset signal GR@FSM in the fingerprint-sensing mode FSM may have the high gate voltage VGH during one frame period FP, and the global reset signal GR@PSM in the PPG-sensing mode PSM may have the high gate voltage VGH during a portion of the frame period FP and may have a low gate voltage VGL during the remaining portion of the frame period FP.

For example, referring to FIGS. 2, 4, and 13, to perform the fingerprint-sensing operation in the fingerprint-sensing mode FSM, the display device 100 may have a reset state RST for one frame period FP, an exposure and integration state EIST for two or more frame periods FP, and a scan state SST for one frame period.

In the frame period FP corresponding to the reset state RST, the readout circuit 150 may provide the global reset signal GR having the high gate voltage VGH to the light-sensing pixel OPD_PX. In the light-sensing pixel OPD_PX, a tenth transistor T10 may provide a reset voltage VRST to an organic photodiode OPD in response to the global reset signal GR having the high gate voltage VGH, and the organic photodiode OPD (or an anode voltage of the organic photodiode OPD) may be reset based on the reset voltage VRST.

During the frame periods FP corresponding to the exposure and integration state EIST, the light-sensing pixel OPD_PX may receive light reflected from a fingerprint, and the anode voltage of the organic photodiode OPD may be gradually increased. Meanwhile, the light-sensing pixel OPD_PX arranged corresponding to a ridge region of the fingerprint may receive reflected light having relatively low intensity, and the anode voltage of the organic photodiode OPD of the light-sensing pixel OPD_PX arranged corresponding to the ridge region may be increased by a relatively small amount. Alternatively, the light-sensing pixel OPD_PX arranged corresponding to a valley region of the fingerprint may receive reflected light having relatively high intensity, and the anode voltage of the organic photodiode OPD of the light-sensing pixel OPD_PX arranged corresponding to the valley region may be increased by a relatively large amount.

In the frame period FP corresponding to the scan state SST, sensing currents of the light-sensing pixels OPD_PX may be sequentially converted into a digital sensing signal DSS on a row-by-row basis. For example, a reset switch RSW may connect both ends of an integrating capacitor ICAP to each other in response to a readout reset signal RRST having a high level, and the integrating capacitor ICAP may be reset. Subsequently, a noise switching signal NSS may have a high level, a noise switch NSW may connect an output terminal of an amplifier AMP to a noise capacitor NCAP, and a noise voltage output from the amplifier AMP may be stored in the noise capacitor NCAP before the amplifier AMP receives the sensing current of the light-sensing pixel OPD_PX. Thereafter, with respect to the light-sensing pixels OPD_PX arranged in a first pixel row, an eleventh transistor T11 may transfer the sensing current generated by a ninth transistor T9 to a readout line RL in response to a write signal GW[1] having a low level, an integrator including the amplifier AMP and the integrating capacitor ICAP may integrate the sensing current to output a signal voltage, a signal switch SSW may connect the output terminal of the amplifier AMP to a signal capacitor SCAP in response to a signal switching signal SSS having a high level, and the signal capacitor SCAP may store the signal voltage. An analog-to-digital converter ADC may generate a digital sensing signal DSS for the first pixel row based on a difference between the noise voltage stored in the noise capacitor NCAP and the signal voltage stored in the signal capacitor SCAP. Further, the readout reset signal RRST and the noise switching signal NSS may sequentially have a high level, the integrating capacitor ICAP may be reset, and the noise voltage may be stored in the noise capacitor NCAP. Then, with respect to the light-sensing pixels OPD_PX arranged in a second pixel row, a write signal GW[2] may have a low level, the signal switching signal SSS may have a high level, and the digital sensing signal DSS for the second pixel row may be generated. In this way, the sensing currents of the light-sensing pixels OPD_PX may be sequentially converted into the digital sensing signal DSS on a row-by-row basis.

Further, referring to FIGS. 2, 4, and 14, to perform the PPG-sensing operation in the PPG-sensing mode PSM, the display device 100 may have a reset state RST and a scan state SST in each of a plurality of frame periods FP.

An initial portion of each frame period FP corresponding to the reset state RST, the readout circuit 150 may provide the global reset signal GR having the high gate voltage VGH to the light-sensing pixel OPD_PX. In the light-sensing pixel OPD_PX, the tenth transistor T10 may provide the reset voltage VRST to the organic photodiode OPD in response to the global reset signal GR having the high gate voltage VGH, and the organic photodiode OPD (or an anode voltage of the organic photodiode OPD) may be reset based on the reset voltage VRST.

In the remaining portion of each frame period FP corresponding to the scan state SST, write signals GW[1], GW[2], . . . for a plurality of pixel rows may sequentially have a low level, and each of the readout reset signal RRST, the noise switching signal NSS, and the signal switching signal SSS may periodically have a high level. Further, the readout reset signal RRST and the noise switching signal NSS may sequentially have the high level while all of the write signals GW[1], GW[2], . . . have a high level. The signal switching signal SSS may have the high level while any one of the write signals GW[1], GW[2], . . . has the low level. Further, the integrating capacitor ICAP may be reset while the readout reset signal RRST has the high level, and a noise voltage may be stored in the noise capacitor NCAP while the noise switching signal NSS has the high level. In addition, while the write signals GW[1], GW[2], . . . have the low level and the signal switching signal SSS has the high level, a signal voltage may be stored in the signal capacitor SCAP, and a digital sensing signal DSS corresponding to a difference between the noise voltage and the signal voltage may be generated. Because the write signals GW[1], GW[2], . . . for the plurality of rows sequentially have the low level, the digital sensing signals DSS for the plurality of rows may be sequentially generated.

As described above, the timing of the global reset signal GR may be improved or optimized in each of the fingerprint-sensing mode FSM and the PPG-sensing mode PSM, and the fingerprint-sensing operation in the fingerprint-sensing mode FSM and the PPG-sensing operation in the PPG-sensing mode PSM may be more accurately performed.

Figure 15:
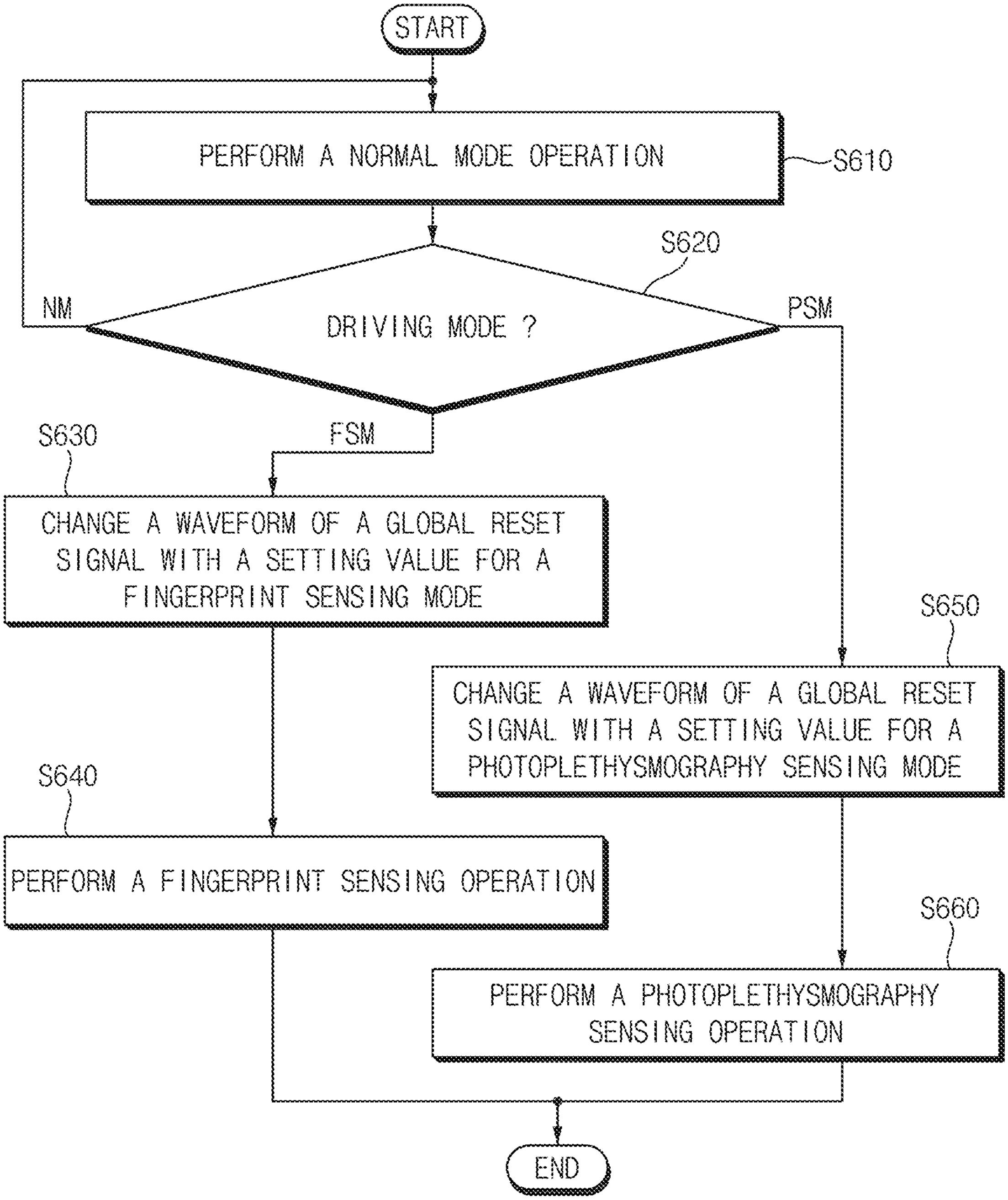
FIG. 15 is a flowchart illustrating a method of operating a display device according to embodiments.
Figure 16:
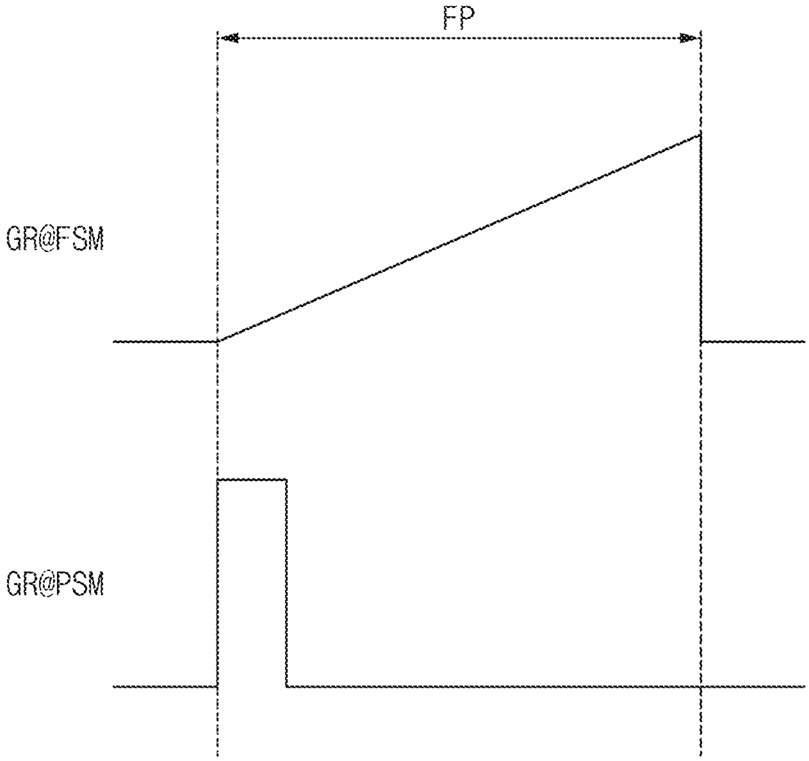
FIG. 16 is a timing diagram illustrating another example of a global reset signal in a fingerprint-sensing mode and a photoplethysmography-sensing mode.

FIG. 15 is a flowchart illustrating a method of operating a display device according to embodiments, and FIG. 16 is a timing diagram illustrating another example of a global reset signal in a fingerprint-sensing mode and a PPG-sensing mode.

Referring to FIGS. 1 and 15, a display device 100 may perform a normal mode operation that displays an image by driving light-emitting pixels EL_PX (S610). Further, when a mode signal SMODE indicates a normal mode NM (S620: NM), the display device 100 may continue to perform the normal mode operation (S610).

When the mode signal SMODE indicates a fingerprint-sensing mode FSM (S620: FSM), the display device 100 may change a waveform of a global reset signal GR provided to light-sensing pixels OPD_PX with a setting value for the fingerprint-sensing mode FSM (S630), and may perform a fingerprint-sensing operation based on the global reset signal GR of which the waveform is changed (S640). Further, when the mode signal SMODE indicates a PPG-sensing mode PSM (S620: PSM), the display device 100 may change the waveform of the global reset signal GR provided to the light-sensing pixels OPD_PX with a setting value for the PPG-sensing mode PSM (S650), and may perform a PPG-sensing operation based on the global reset signal GR of which the waveform is changed (S660). That is, a readout circuit 150 of the display device 100 may change the waveform of the global reset signal GR between the fingerprint-sensing mode FSM and the PPG-sensing mode PSM.

In some embodiments, as illustrated in FIG. 16, the readout circuit 150 may provide the global reset signal GR@FSM having a triangle wave shape to the light-sensing pixels OPD_PX in the fingerprint-sensing mode FSM, and may provide the global reset signal GR@PSM having a square wave shape to the light-sensing pixels OPD_PX in the PPG-sensing mode PSM. Accordingly, the waveform of the global reset signal GR may be improved or optimized in each of the fingerprint-sensing mode FSM and the PPG-sensing mode PSM, and the fingerprint-sensing operation in the fingerprint-sensing mode FSM and the PPG-sensing operation in the PPG-sensing mode PSM may be more accurately performed. Although FIG. 16 illustrates an example of the waveform of the global reset signal GR@FSM in the fingerprint-sensing mode FSM and the waveform of the global reset signal GR@PSM in the PPG-sensing mode PSM, the waveform of the global reset signal GR@FSM and GR@PSM in the fingerprint-sensing mode FSM and the PPG-sensing mode PSM is not limited to the example of FIG. 16.

Figure 17:
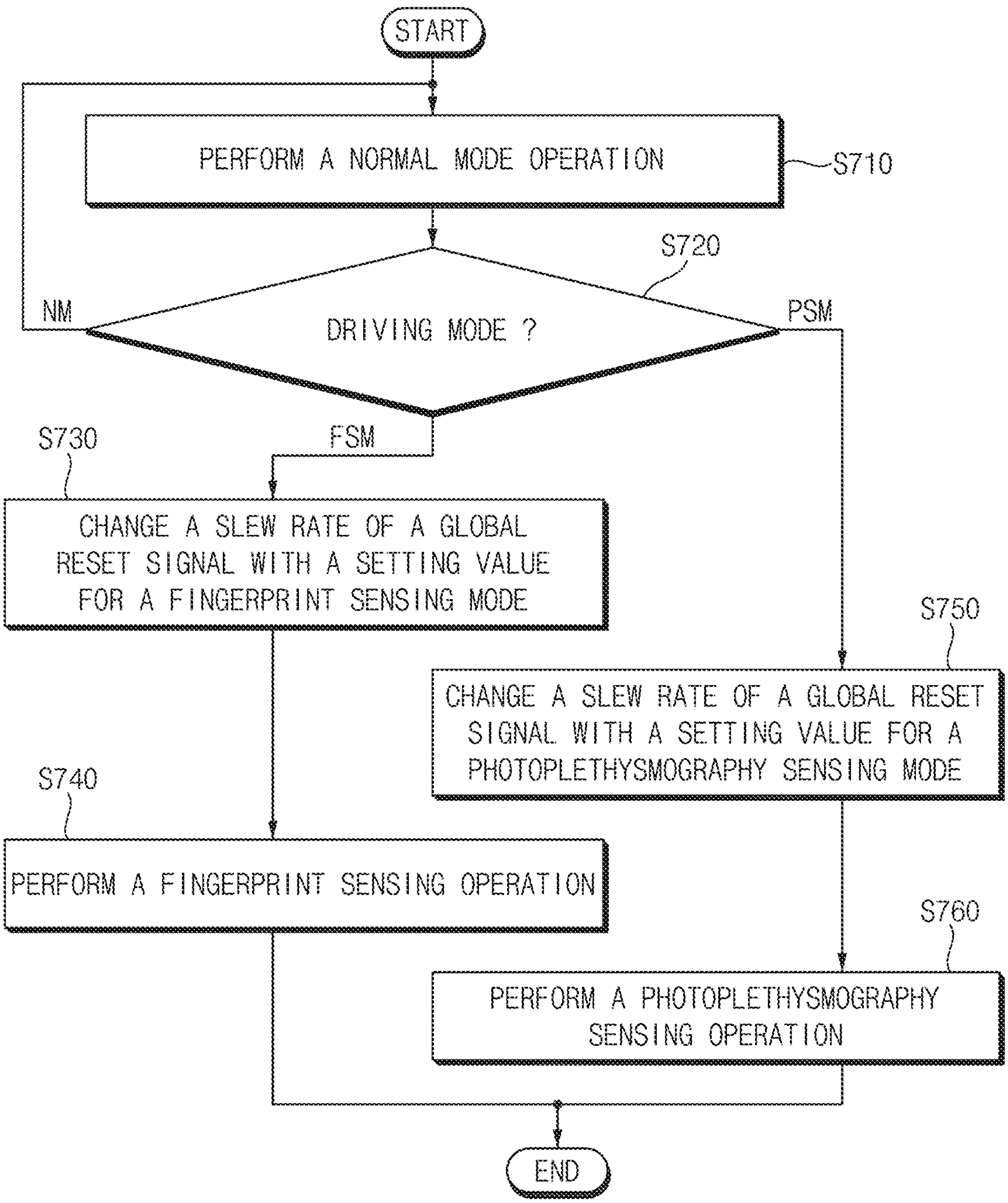
FIG. 17 is a flowchart illustrating a method of operating a display device according to embodiments.
Figure 18:
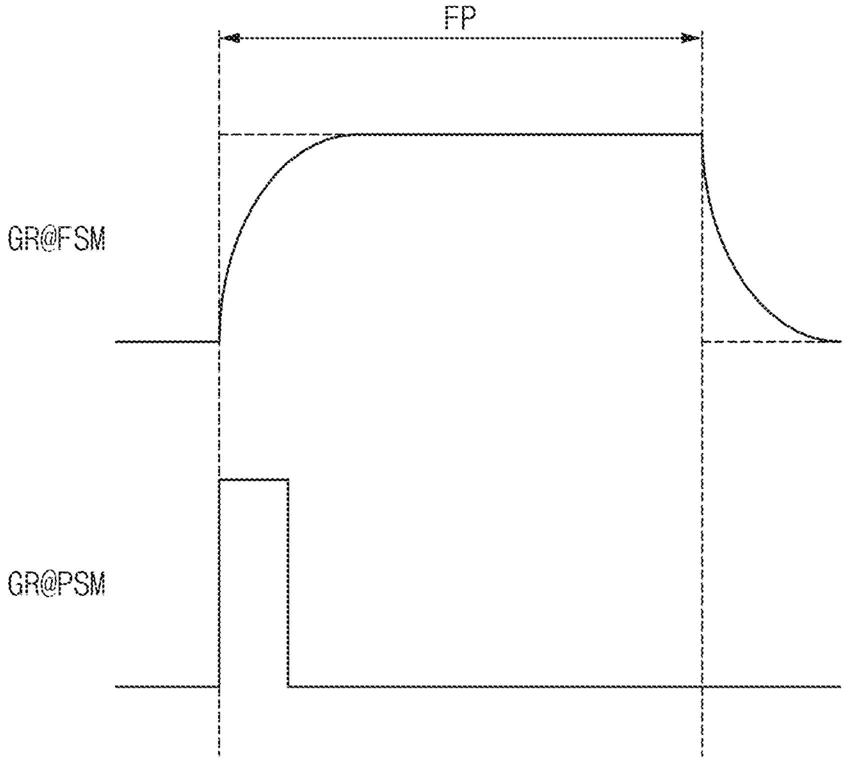
FIG. 18 is a timing diagram illustrating still another example of a global reset signal in a fingerprint-sensing mode and a photoplethysmography-sensing mode.

FIG. 17 is a flowchart illustrating a method of operating a display device according to embodiments, and FIG. 18 is a timing diagram illustrating still another example of a global reset signal in a fingerprint-sensing mode and a PPG-sensing mode.

Referring to FIGS. 1 and 17, a display device 100 may perform a normal mode operation that displays an image by driving light-emitting pixels EL_PX (S710). Further, when a mode signal SMODE indicates a normal mode NM (S720: NM), the display device 100 may continue to perform the normal mode operation (S710).

When the mode signal SMODE indicates a fingerprint-sensing mode FSM (S720: FSM), the display device 100 may change a slew rate of a global reset signal GR provided to light-sensing pixels OPD_PX with a setting value for the fingerprint-sensing mode FSM (S730), and may perform a fingerprint-sensing operation based on the global reset signal GR having the changed slew rate (S740). Further, when the mode signal SMODE indicates a PPG-sensing mode PSM (S720: PSM), the display device 100 may change the slew rate of the global reset signal GR provided to the light-sensing pixels OPD_PX with a setting value for the PPG-sensing mode PSM (S750), and may perform a PPG-sensing operation based on the global reset signal GR having the changed slew rate (S760). That is, a readout circuit 150 of the display device 100 may change the slew rate of the global reset signal GR between the fingerprint-sensing mode FSM and the PPG-sensing mode PSM.

In some embodiments, as illustrated in FIG. 18, the readout circuit 150 may provide the global reset signal GR@FSM having a relatively low slew rate to the light-sensing pixels OPD_PX in the fingerprint-sensing mode FSM, and may provide the global reset signal GR@PSM having a relatively high slew rate to the light-sensing pixels OPD_PX in the PPG-sensing mode PSM. Accordingly, the slew rate of the global reset signal GR may be improved or optimized in each of the fingerprint-sensing mode FSM and the PPG-sensing mode PSM, and the fingerprint-sensing operation in the fingerprint-sensing mode FSM and the PPG-sensing operation in the PPG-sensing mode PSM may be more accurately performed. Although FIG. 18 illustrates an example of the slew rate of the global reset signal GR@FSM in the fingerprint-sensing mode FSM and the slew rate of the global reset signal GR@PSM in the PPG-sensing mode PSM, the slew rate of the global reset signal GR@FSM and GR@PSM in the fingerprint-sensing mode FSM and the PPG-sensing mode PSM is not limited to the example of FIG. 18.

Although FIG. 7 illustrates one or more embodiments in which the voltage level of the reset voltage VRST is changed, FIG. 9 illustrates one or more embodiments in which the voltage level of the global reset signal GR is changed, FIG. 11 illustrates one or more embodiments in which the timing of the global reset signal GR is changed, FIG. 15 illustrates one or more embodiments in which the waveform of the global reset signal GR is changed, and FIG. 17 illustrates one or more embodiments in which the slew rate of the global reset signal GR is changed, those skilled in the art would understand that any combination of the embodiments of FIGS. 7, 9, 11, 15, and/or 17 can be used. For example, among the normal mode NM, the fingerprint-sensing mode FSM, and the PPG-sensing mode PSM, the voltage level of the reset voltage VRST may be changed, and at least one of the voltage level, the timing, the waveform, or the slew rate of the global reset signal GR may be changed.

Figure 19:
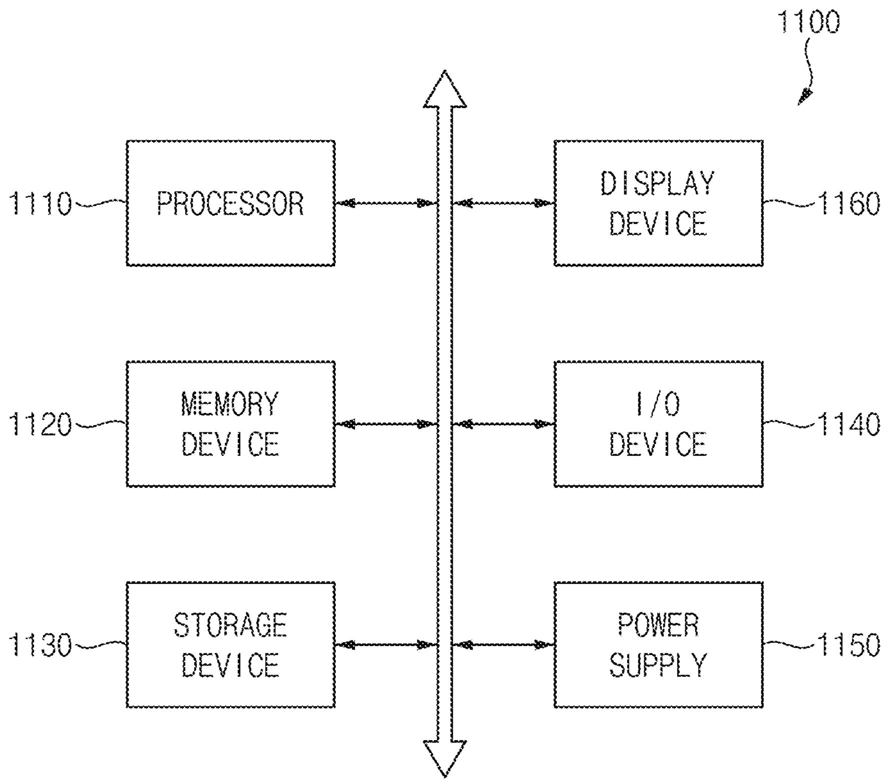
FIG. 19 is a block diagram illustrating an electronic device including a display device according to embodiments.

FIG. 19 is a block diagram illustrating an electronic device including a display device according to embodiments.

Referring to FIG. 19, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electronic devices, etc.

The processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device, such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device, such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, a readout circuit may change at least one of a global reset signal or a reset voltage provided to a light-sensing circuit between a first sensing mode (e.g., a fingerprint-sensing mode) and a second sensing mode (e.g., a PPG-sensing mode). In some embodiments, a voltage level of the reset voltage may be changed among a normal mode, the fingerprint-sensing mode and the PPG-sensing mode. In other embodiments, at least one of a voltage level, a timing, a waveform, or a slew rate of the global reset signal may be changed among the normal mode, the fingerprint-sensing mode and the PPG-sensing mode. Accordingly, driving conditions may be improved or optimized in respective sensing modes, and sensing operations may be more accurately performed in the respective sensing modes.

The concepts may be applied to any electronic device 1100 including the display device 1160. For example, the concepts may be applied to a smart phone, a wearable electronic device, a mobile phone, a television (TV) (e.g., a digital TV, a three-dimensional (3D) TV, etc.), a personal computer (PC) (e.g., a tablet computer, a laptop computer, etc.), a home appliance, a personal digital assistant (PDA), a portable multimedia player (PMP), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims, with functional equivalents thereof to be included therein.

What is claimed is:

1. A display device comprising:

a display panel comprising a light-emitting pixel comprising a light-emitting element, and a light-sensing pixel comprising an organic photodiode, and configured to reset the organic photodiode to a reset voltage in response to a global reset signal;

a data driver configured to provide a data signal to the light-emitting pixel;

a scan driver configured to provide a scan signal to the light-emitting pixel and to the light-sensing pixel; and a readout circuit connected to the light-sensing pixel through a readout line, and configured to change at least one of the global reset signal or the reset voltage between a first sensing mode and a second sensing mode, wherein the first sensing mode is a fingerprint-sensing mode, and the second sensing mode is a photoplethysmography-sensing mode, wherein, in the fingerprint-sensing mode, the light-emitting pixel in a first sensing region is configured to emit light, and the light-sensing pixel in the first sensing region is configured to sense reflected light, and wherein, in the photoplethysmography-sensing mode, the light-emitting pixel in an adjacent region adjacent to a second sensing region is configured to emit light, and the light-sensing pixel in the second sensing region is configured to sense reflected light.

2. The display device of claim 1, wherein the readout circuit is configured to change a voltage level of the reset voltage between the fingerprint-sensing mode and the photoplethysmography-sensing mode.

3. The display device of claim 2, wherein, in a normal mode, the readout circuit is configured to set the reset voltage to a first voltage level, wherein, in the fingerprint-sensing mode, the readout circuit is configured to set the reset voltage to a second voltage level that is different from the first voltage level, and wherein, in the photoplethysmography-sensing mode, the readout circuit is configured to set the reset voltage to a third voltage level that is different from the first and second voltage levels.

4. The display device of claim 3, wherein the second voltage level is lower than the first voltage level, and wherein the third voltage level is higher than the first voltage level.

5. The display device of claim 1, wherein the readout circuit is configured to change a voltage level of a low gate voltage of the global reset signal between the fingerprint-sensing mode and the photoplethysmography-sensing mode.

6. The display device of claim 5, wherein, in a normal mode, the readout circuit is configured to set the low gate voltage of the global reset signal to a first voltage level, wherein, in the fingerprint-sensing mode, the readout circuit is configured to set the low gate voltage of the global reset signal to a second voltage level that is different from the first voltage level, and wherein, in the photoplethysmography-sensing mode, the readout circuit is configured to set the low gate voltage of the global reset signal to the first voltage level.

7. The display device of claim 1, wherein the readout circuit is configured to change a timing of a low gate voltage of the global reset signal between the fingerprint-sensing mode and the photoplethysmography-sensing mode.

8. The display device of claim 7, wherein, in the fingerprint-sensing mode, the readout circuit is configured to provide the global reset signal having a high gate voltage to the light-sensing pixel during a first frame period, and wherein, in the photoplethysmography-sensing mode, the readout circuit is configured to provide the global reset signal having the high gate voltage to the light-sensing pixel during a portion of a second frame period.

9. The display device of claim 1, wherein the readout circuit is configured to change at least one of a waveform or a slew rate of the global reset signal between the fingerprint-sensing mode and the photoplethysmography-sensing mode.

10. The display device of claim 1, wherein the light-emitting pixel comprises:

a first transistor configured to generate a driving current;

the light-emitting element configured to emit light based on the driving current;

a second transistor configured to transfer the data signal in response to a write signal;

a third transistor configured to diode-connect the first transistor in response to a compensation signal;

a fourth transistor configured to transfer an initialization voltage to a gate of the first transistor in response to an initialization signal;

a fifth transistor configured to connect a line that is configured to transfer a first power supply voltage and the first transistor in response to an emission signal;

a sixth transistor configured to connect the first transistor and the light-emitting element in response to the emission signal;

a seventh transistor configured to transfer an anode initialization voltage to the light-emitting element in response to a bypass signal;

an eighth transistor configured to transfer a bias voltage to one terminal of the first transistor in response to the bypass signal; and a storage capacitor connected between the line that is configured to transfer the first power supply voltage and the gate of the first transistor.

11. The display device of claim 10, wherein the light-sensing pixel comprises:

a ninth transistor configured to generate a sensing current based on a voltage of an anode of the organic photodiode;

a tenth transistor configured to transfer the reset voltage to the anode of the organic photodiode in response to the global reset signal;

an eleventh transistor configured to connect the ninth transistor and the readout line in response to the write signal; and the organic photodiode.

12. The display device of claim 11, wherein the ninth transistor comprises a gate connected to the organic photodiode, a first terminal that is configured to receive a sensing reference voltage, and a second terminal, wherein the tenth transistor comprises a gate that is configured to receive the global reset signal, a first terminal that is configured to receive the reset voltage, and a second terminal connected to the anode of the organic photodiode, wherein the eleventh transistor comprises a gate that is configured to receive the write signal, a first terminal connected to the second terminal of the ninth transistor, and a second terminal connected to the readout line, and wherein the anode of the organic photodiode is connected to the gate of the ninth transistor, and a cathode of the organic photodiode is connected to a line that is configured to transfer a second power supply voltage.

13. The display device of claim 1, wherein the readout circuit comprises:

a global reset circuit configured to generate the global reset signal;

a sensing circuit configured to receive a sensing current of the light-sensing pixel through the readout line, and to generate a digital sensing signal corresponding to the sensing current; and a register configured to store setting values for the global reset signal and the reset voltage in a normal mode, the first sensing mode, and the second sensing mode.

14. The display device of claim 13, wherein the sensing circuit comprises:

an amplifier comprising an inverting input terminal connected to the readout line, a non-inverting input terminal that is configured to receive a reference voltage, and an output terminal;

an integrating capacitor connected between the inverting input terminal and the output terminal of the amplifier;

a reset switch configured to reset the integrating capacitor;

a noise capacitor configured to store a noise voltage output from the amplifier;

a noise switch configured to selectively connect the output terminal of the amplifier and the noise capacitor;

a signal capacitor configured to store a signal voltage output from the amplifier;

a signal switch configured to selectively connect the output terminal of the amplifier and the signal capacitor; and an analog-to-digital converter configured to generate the digital sensing signal based on a difference between the noise voltage and the signal voltage.

15. An electronic device comprising:

a processor configured to provide input image data; and a display device configured to receive the input image data from the processor, and to display an image based on the input image data, the display device comprising:

a display panel comprising a light-emitting pixel comprising a light-emitting element, and a light-sensing pixel comprising an organic photodiode, and configured to reset the organic photodiode to a reset voltage in response to a global reset signal;

a data driver configured to provide a data signal to the light-emitting pixel;

a scan driver configured to provide a scan signal to the light-emitting pixel and to the light-sensing pixel; and a readout circuit connected to the light-sensing pixel through a readout line, and configured to change a voltage level of the reset voltage among a normal mode, a fingerprint-sensing mode, and a photoplethysmography-sensing mode, wherein, in the fingerprint-sensing mode, the light-emitting pixel in a first sensing region is configured to emit light, and the light-sensing pixel in the first sensing region is configured to sense reflected light, and wherein, in the photoplethysmography-sensing mode, the light-emitting pixel in an adjacent region adjacent to a second sensing region is configured to emit light, and the light-sensing pixel in the second sensing region is configured to sense reflected light.

16. The electronic device of claim 15, wherein, in the normal mode, the readout circuit is configured to set the reset voltage to a first voltage level, wherein, in the fingerprint-sensing mode, the readout circuit is configured to set the reset voltage to a second voltage level that is different from the first voltage level, and wherein, in the photoplethysmography-sensing mode, the readout circuit is configured to set the reset voltage to a third voltage level that is different from the first and second voltage levels.

17. An electronic device comprising:

a processor configured to provide input image data; and a display device configured to receive the input image data from the processor, and to display an image based on the input image data, the display device comprising:

a display panel comprising a light-emitting pixel comprising a light-emitting element, and a light-sensing pixel comprising an organic photodiode and configured to reset the organic photodiode to a reset voltage in response to a global reset signal;

a data driver configured to provide a data signal to the light-emitting pixel;

a scan driver configured to provide a scan signal to the light-emitting pixel and to the light-sensing pixel; and a readout circuit connected to the light-sensing pixel through a readout line, and configured to change at least one of a voltage level, a timing, a waveform, or a slew rate of the global reset signal among a normal mode, a fingerprint-sensing mode, and a photoplethysmography-sensing mode, wherein, in the fingerprint-sensing mode, the light-emitting pixel in a first sensing region is configured to emit light, and the light-sensing pixel in the first sensing region is configured to sense reflected light, and wherein, in the photoplethysmography-sensing mode, the light-emitting pixel in an adjacent region adjacent to a second sensing region is configured to emit light, and the light-sensing pixel in the second sensing region is configured to sense reflected light.

18. The electronic device of claim 17, wherein, in the normal mode, the readout circuit is configured to set a low gate voltage of the global reset signal to a first voltage level, wherein, in the fingerprint-sensing mode, the readout circuit is configured to set the low gate voltage of the global reset signal to a second voltage level that is different from the first voltage level, and wherein, in the photoplethysmography-sensing mode, the readout circuit is configured to set the low gate voltage of the global reset signal to the first voltage level.

19. The electronic device of claim 17, wherein, in the fingerprint-sensing mode, the readout circuit is configured to provide the global reset signal having a high gate voltage to the light-sensing pixel during a first frame period, and wherein, in the photoplethysmography-sensing mode, the readout circuit is configured to provide the global reset signal having the high gate voltage to the light-sensing pixel during a portion of a second frame period.

* * * * *